(12) United States Patent
Luebke et al.

(10) Patent No.: US 7,319,853 B2
(45) Date of Patent: Jan. 15, 2008

(54) HOME SYSTEM INCLUDING A PORTABLE FOB HAVING A DISPLAY

(75) Inventors: Charles John Luebke, Sussex, WI (US); Michael Andrew Higgins, Pittsburgh, PA (US)

(73) Assignee: Easton Corporation, Cleveland, OH (US)

( * ) Notice: Subject to any disclaimer, the term of this patent is extended or adjusted under 35 U.S.C. 154(b) by 539 days.

(21) Appl. No.: 10/686,187

(22) Filed: Oct. 15, 2003

(65) Prior Publication Data

US 2005/0086366 A1 Apr. 21, 2005

(51) Int. Cl.
 H04B 1/06 (2006.01)
 H04B 7/00 (2006.01)
(52) U.S. Cl. .............. 455/344; 455/41.2; 455/566
(58) Field of Classification Search .......... 455/344, 455/552.1, 66.1, 67.11, 556.1, 566, 41.2, 455/352, 557, 554.2, 550.1, 418, 419, 420, 455/448, 426.1, 456.2, 456.3, 456.5; 725/40; 370/331, 255, 236, 396, 395.1, 400, 398, 370/328, 252, 338; 719/318; 713/156; 709/238, 709/224; 700/90, 19
See application file for complete search history.

(56) References Cited

U.S. PATENT DOCUMENTS

| 5,987,011 | A | 11/1999 | Toh |
| 6,034,961 | A | 3/2000 | Masuo et al. |
| 6,167,025 | A | 12/2000 | Hsing et al. |
| 6,757,521 | B1* | 6/2004 | Ying .................. 455/67.11 |
| 6,792,323 | B2* | 9/2004 | Krzyzanowski et al. ...... 700/90 |
| 7,089,298 | B2* | 8/2006 | Nyman et al. .............. 709/220 |
| 2002/0023265 | A1* | 2/2002 | Metcalf .................. 725/74 |
| 2002/0080029 | A1 | 6/2002 | Menard et al. |
| 2004/0233855 | A1* | 11/2004 | Gutierrez et al. ........... 370/252 |
| 2004/0235468 | A1* | 11/2004 | Luebke et al. ............. 455/448 |
| 2004/0260407 | A1* | 12/2004 | Wimsatt ................ 700/19 |

FOREIGN PATENT DOCUMENTS

| EP | 0 874 341 B1 | 10/1998 |
| WO | WO 99/17477 | 4/1999 |
| WO | WO 99/46923 | 9/1999 |
| WO | WO 00/75900 A1 | 12/2000 |

OTHER PUBLICATIONS

Johnson, David B., et al.,"Dynamic Source Routing in Ad Hoc Wireless Networks", Mobile Computing, 1996, 18 pp.

(Continued)

*Primary Examiner*—Quochien B. Vuong
(74) *Attorney, Agent, or Firm*—Martin J. Moran

(57) ABSTRACT

A home wellness system includes a headless base station having a first wireless communication port, a portable fob having a second wireless communication port, a user input device and a display, and plurality of sensors. Each of the sensors senses information and includes a third wireless communication port, which sends the sensed information to the first wireless communication port of the headless base station. The headless base station sends the sensed information for one, some or all of the sensors from its first wireless communication port to the second wireless communication port of the portable fob. The portable fob displays the sensed information for one, more or all of the sensors at its display.

23 Claims, 20 Drawing Sheets

OTHER PUBLICATIONS

Cui Inc., "AEC11BRXE-XXXXA1-XXX", 2002, 2 pp.
Chipcon, "CC1010 Product Information", http://www.chipcon.com/index.cfm?kat_id=2&subkat_id=12&dok_id=55, Oct. 6, 2003, 2 pp.
SearchSecurity.com, "key fob," http://searchsecurity.techtarget.com/sDefinition/0,,sid14_gci795968.00.html, Sep. 22, 2003, 2 pp.
Panasonic, "Slide Switches, Detector Switches, Power/Push Switches", www.digikey.com,.pp. 863-64.
GE Industrial Systems, "Electronic House Magazine Names Smart ConnectionCenter and NetworX NX-8E Product of the Year", Aug. 12, 2003, 2 pp.
GE Industrial Systems, "GE Interlogix Releases The Concord Ultra Security System", Sep. 2, 2003, 2 pp.
Moore, M.A., "Integrated Alarm System and Cordless Phone", 8182 Motorola Technical Developments, Oct. 1990, pp. 82-85.

* cited by examiner

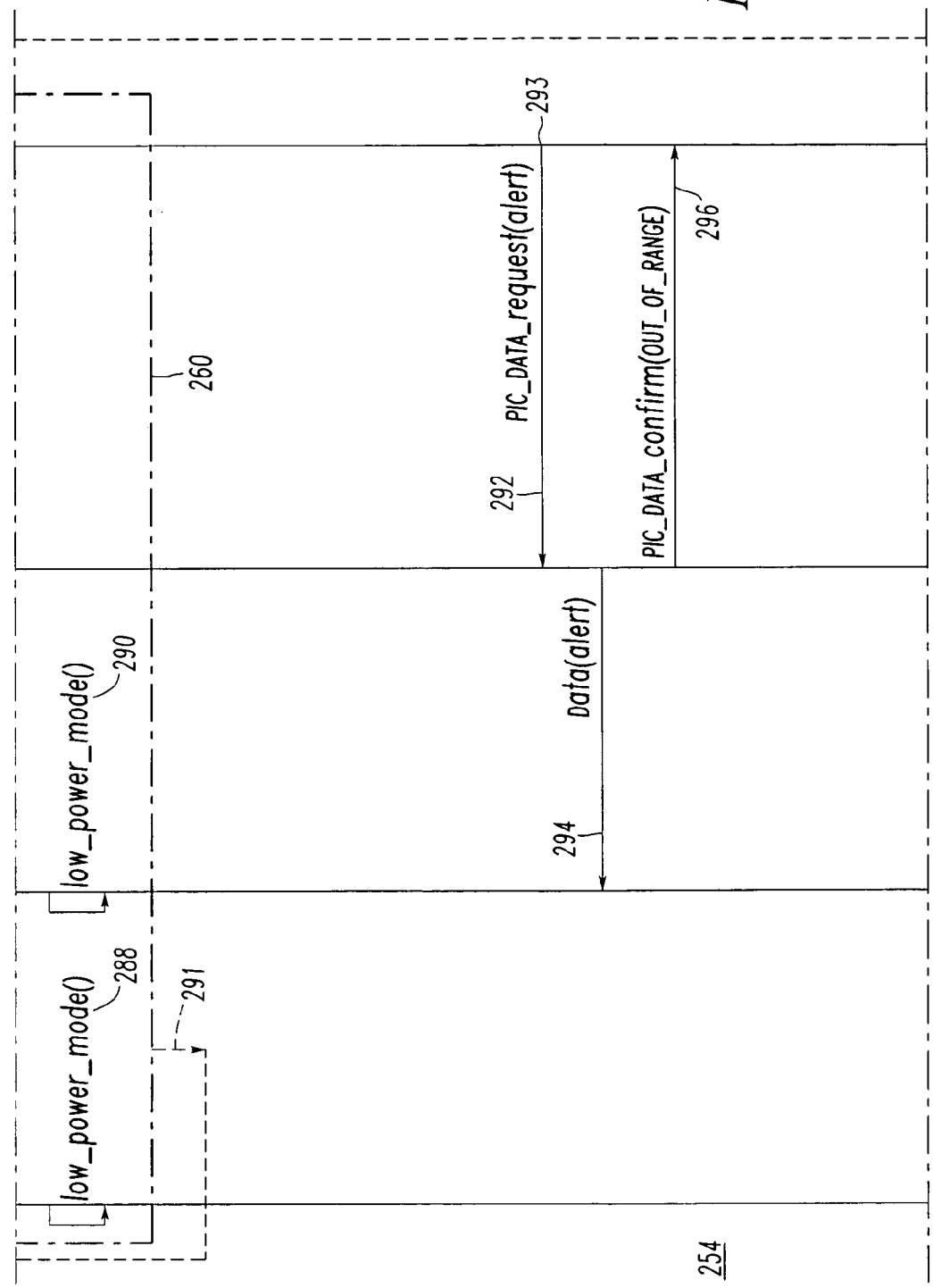

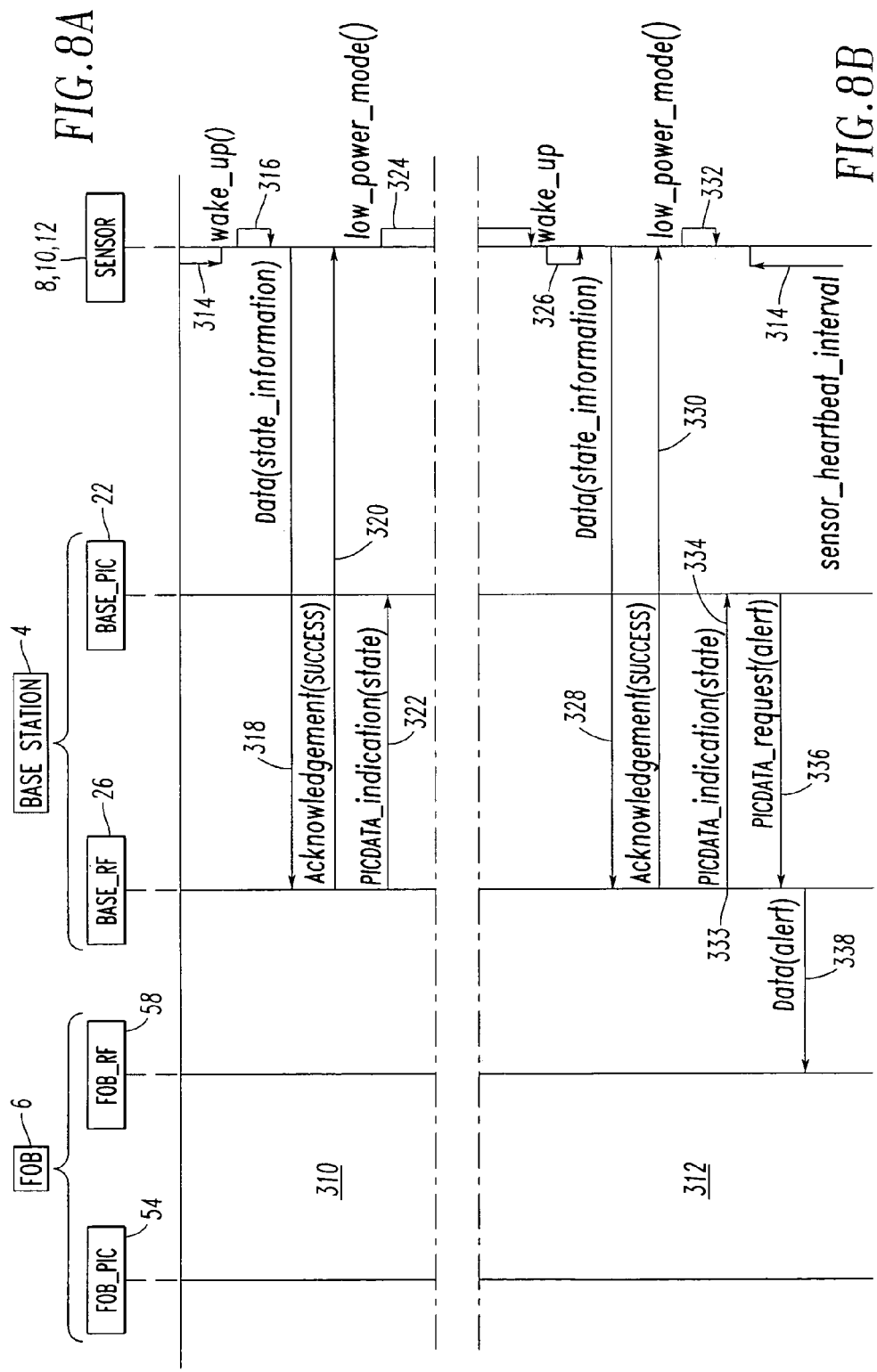

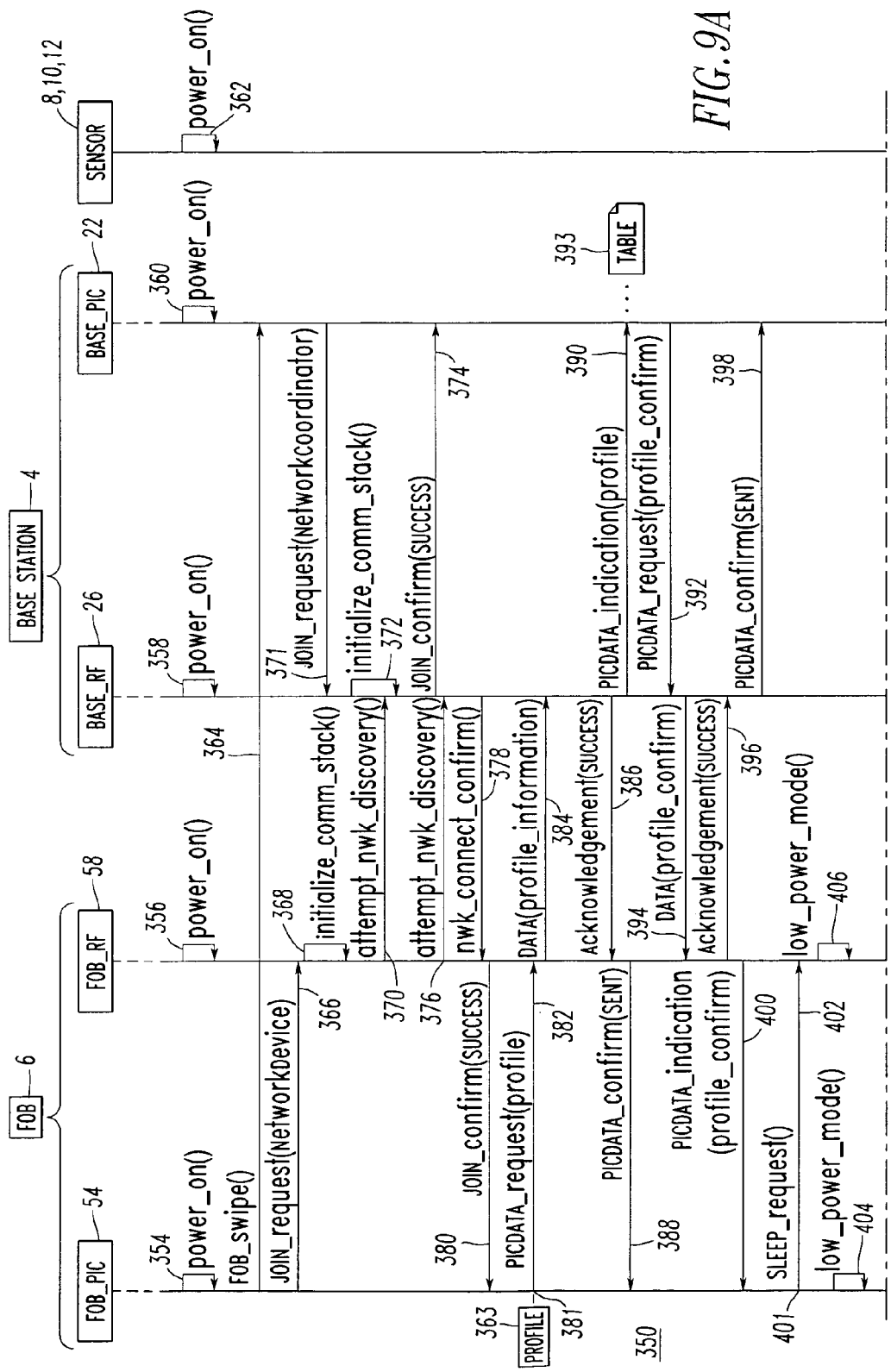

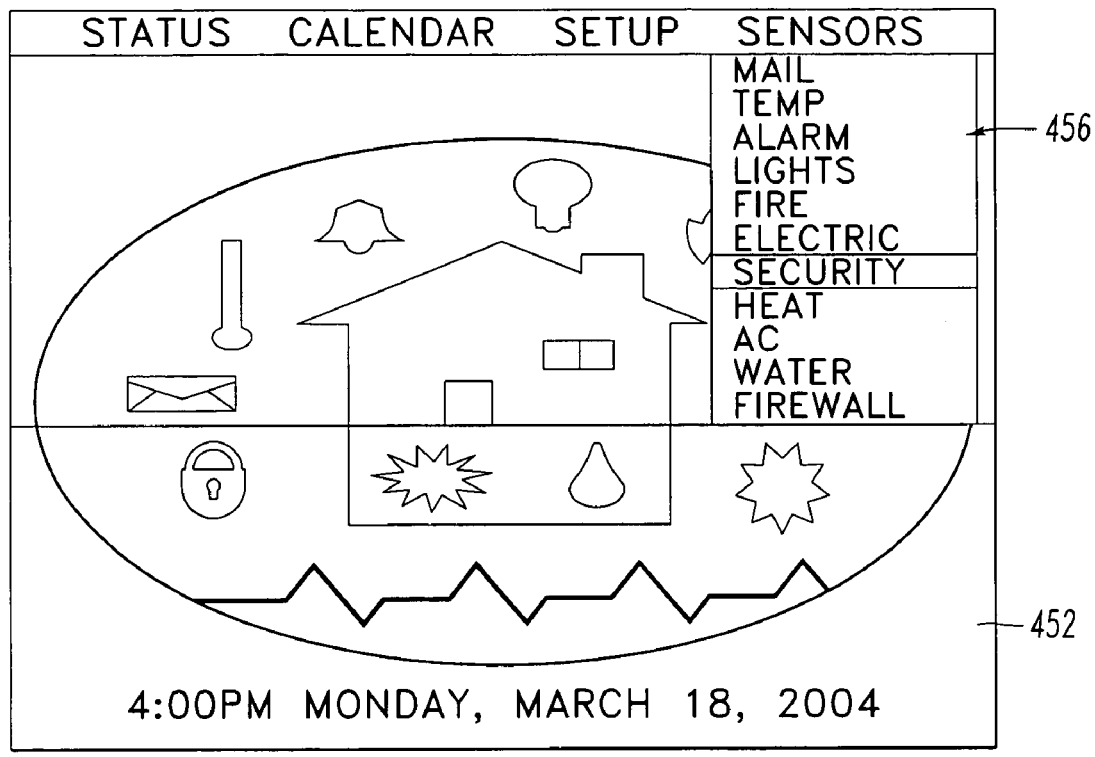
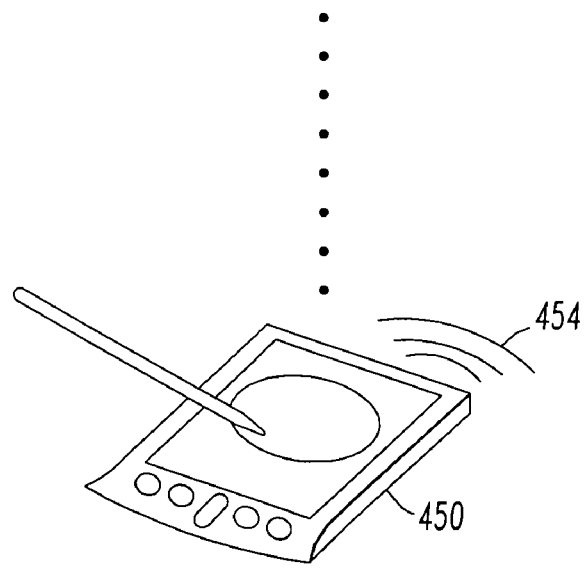
FIG. 10

HOME SYSTEM INCLUDING A PORTABLE FOB HAVING A DISPLAY

CROSS-REFERENCE TO RELATED APPLICATIONS

This application is related to commonly assigned, concurrently filed:

U.S. patent application Ser. No. 10/686,179, filed Oct. 15, 2003, entitled "Home System Including A Portable Fob Having A Rotary Menu And A Display"; and U.S. patent application Ser. No. 10/686,016, filed Oct. 15, 2003, entitled "Home System Including A Portable Fob Mating With System Components".

BACKGROUND OF THE INVENTION

1. Field of the Invention

This invention relates generally to home systems and, more particularly, to home systems employing sensors and wireless communications, such as, for example, a wireless local area network (WLAN) or a low rate—wireless personal area network (LR-WPAN).

2. Background Information

Wireless communication networks are an emerging new technology, which allows users to access information and services electronically, regardless of their geographic position.

All nodes in ad-hoc networks are potentially mobile and can be connected dynamically in an arbitrary manner. All nodes of these networks behave as routers and take part in discovery and maintenance of routes to other nodes in the network. For example, ad-hoc networks are very useful in emergency search-and-rescue operations, meetings or conventions in which persons wish to quickly share information, and in data acquisition operations in inhospitable terrains.

An ad-hoc mobile communication network comprises a plurality of mobile hosts, each of which is able to communicate with its neighboring mobile hosts, which are a single hop away. In such a network, each mobile host acts as a router forwarding packets of information from one mobile host to another. These mobile hosts communicate with each other over a wireless media, typically without any infrastructured (or wired) network component support.

One type of on-demand ad-hoc routing protocol is Dynamic Source Routing (DSR). A conventional DSR network enables communications between any devices in such network by discovering communication routes to other devices in the network. See, for example, Johnson et al., "Dynamic Source Routing in Ad Hoc Wireless Networks", Mobile Computing, 1996. Dynamic Source Routing for mobile communication networks avoids periodic route advertisements because route caches are used to store source routes that a mobile host has learned over time. A combination of point-to-point and broadcast routing using the connection-oriented packet forwarding approach is used. Routes are source-initiated and discovered via a route discovery protocol. With source routing, the sender explicitly lists the route in each packet's header, in order that the next-hop nodes are identified as the packet travels towards the destination. Cached route information is used and accurate updates of these route caches are essential, otherwise routing loops can occur. Since the sender has to be notified each time a route is truncated, the route maintenance phase does not support fast route reconstruction. See, also, U.S. Pat. Nos. 6,167,025; 6,034,961; and 5,987,011.

The DSR protocol appends a complete list of addresses from the source to the destination for both upstream and downstream (i.e., bi-directional) communications. That is, each device in a DSR network knows the entire path to another device, although this stored path may dynamically change.

In addition to DSR, examples of routing protocol algorithms include Ad hoc on Demand Distance Vector (AODV) and proactive source routing (PSR). In a PSR routing technique, the Network Coordinator (NC) appends a complete list of addresses from that source to the destination Network Device (ND) for downstream communications (from the NC to the ND). For multi-hop downstream communications, the receiving and repeating ND removes its address from the list of addresses from that ND to the next or destination ND. For upstream communications (toward the NC from the ND), the originating ND appends its address in the original message to an upstream node. For multi-hop upstream communications, the receiving and repeating ND appends its address to the list of addresses from that ND to the next upstream ND or to the NC.

In contrast to wired networks, mesh-type, low rate—wireless personal area network (LR-WPAN) wireless communication networks are intended to be relatively low power, to be self-configuring, and to not require any communication infrastructure (e.g., wires) other than power sources.

Home (e.g., residential; house; apartment) monitoring, security, and automation (control) systems are well known.

A common type of stand-alone sensor for the home is the conventional smoke detector, which typically employs an audible signal for alarming and a blinking light (e.g., a LED) as a normal condition monitor. A family of such stand-alone sensors exists including, for example, audible door alarms.

Relatively low power, radio frequency (RF) lighting control systems employ wall-mounted, battery powered, RF switch "sensors". Such a sensor sends a signal to a remote power control device, such as relay, in order to turn one or more house lights on and off.

Unlike stand-alone devices, a low power, RF sensor device allows its sensor to be connected to a remote controller or monitor. A simple example of this is the automatic garage door opener. In this example, the "sensor" is a button in a car. When the button is pushed, this causes the garage door to open or close.

A known mechanism for associating a particular sensor with a given controller may involve pushing a button on the sensor while also pushing a button on the controller. This process usually requires two people.

It is known to provide a sensor system in which a plurality of sensors are connected, either directly with wires or indirectly with RF communications, to a central control and monitoring device. An example of such a sensor system is a security system, which may include a telephone line for dial out/in communication.

One known home security system combines wired and RF sensors with a central base station having a keypad and a display. The RF sensors transmit to the base station. Somewhat like the handheld or keychain RF remote employed to lock/unlock a car's doors, an RF keyfob is employed to arm/disarm the system. The keyfob only transmits and sends a command one way to the base station. The keyfob does not receive any feedback/confirmation, and does not receive or display any information from the system. The base station does not employ a third party remote monitoring service provider, but can be programmed to dial one or more telephone numbers which are selected by the homeowner.

There is room for improvement in systems for the home.

SUMMARY OF THE INVENTION

These needs and others are met by the present invention, which provides a home system in which a server, such as a headless base station, wirelessly sends sensed information for one or more sensors to a portable fob. The portable fob includes a display for displaying sensed information for one, more or all of the sensors of the system.

As an aspect of the invention, a home system comprises: a server including a first wireless communication port; a portable fob including a second wireless communication port, a user input device and a display; and a plurality of sensors, each of the sensors sensing information and including a third wireless communication port, which sends the sensed information to the first wireless communication port of the server, the server sending the sensed information for at least one of the sensors from the first wireless communication port of the server to the second wireless communication port of the portable fob, the portable fob displaying the sensed information for at least one of the sensors at the display of the portable fob.

The display of the portable fob may include a graphical capability. The display of the portable fob may include a plurality of graphical objects, and the user input device of the portable fob may be a single rotary switch, which is employed to select one of the graphical objects of the display. The selection may be provided by pushing the rotary switch.

The display of the portable fob may include a plurality of representations of at least some of the sensors. The user input device of the portable fob may select one of the representations. The display of the portable fob may responsively display the sensed information for a corresponding one of the sensors.

The server may be a headless base station. The server may be a network coordinator for the sensors and the portable fob.

BRIEF DESCRIPTION OF THE DRAWINGS

A full understanding of the invention can be gained from the following description of the preferred embodiments when read in conjunction with the accompanying drawings in which:

FIGS. 7A-7C are message flow diagrams showing the interaction between the fob, the base station and the sensors for monitoring the sensors and sending data to the base station of FIG. 1.

FIGS. 8A-8B are message flow diagrams showing the interaction between one of the sensors and the base station of FIG. 1 for monitoring that sensor.

FIGS. 9A and 9B are message flow diagrams showing the interaction between the fob, one of the sensors and the base station of FIG. 1 for configuring the fob and the sensor, respectively.

FIG. 10 is a block diagram of a PDA associated with the base station of FIG. 1 and the corresponding display screen thereof.

DESCRIPTION OF THE PREFERRED EMBODIMENTS

Figure 1:
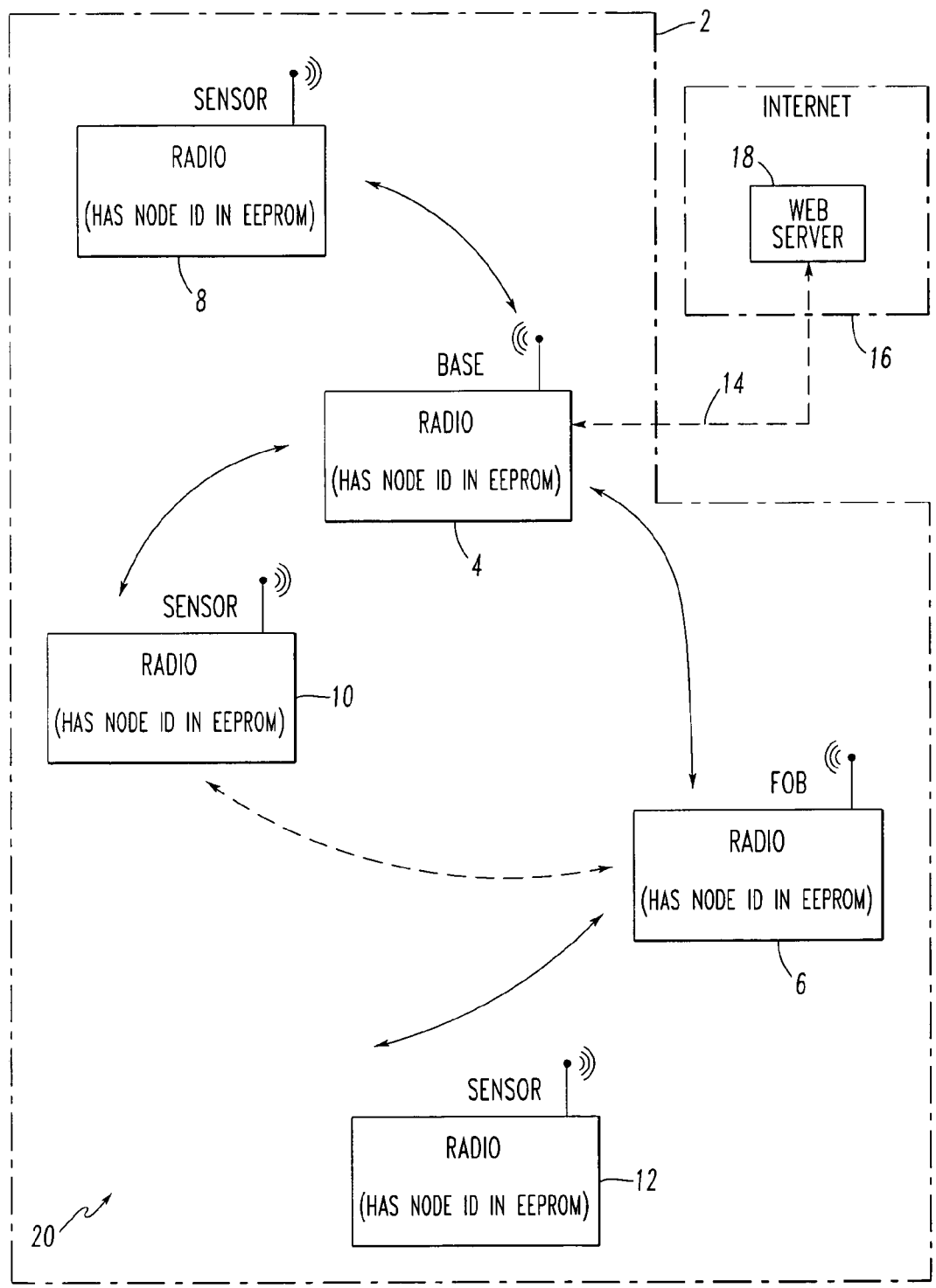
FIG. 1 is a block diagram of a home wellness system in accordance with an embodiment of the present invention.

As employed herein, a home wellness system shall expressly include, but not be limited to, a system for monitoring and/or configuring aspects of a home, such as, for example, home sensors.

As employed herein, the term "wireless" shall expressly include, but not be limited to, radio frequency (RF), infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "handheld portable wireless communicating device" shall expressly include, but not be limited to, any handheld portable communicating device having a wireless communication port (e.g., a handheld wireless device; a handheld personal computer (PC); a Personal Digital Assistant (PDA)).

As employed herein, the term "fob" shall expressly include, but not be limited to, a handheld portable wireless communicating device; a wireless network device; an object that is directly or indirectly carried by a person; an object that is worn by a person; an object that is placed on or attached to a household object (e.g., a refrigerator; a table); an object that is attached to or carried by a personal object (e.g., a purse; a wallet; a credit card case); a portable object; and/or a handheld object.

As employed herein, the term "user input device" shall expressly include, but not be limited to, any suitable transducer (e.g., a rotary encoder; a joystick; a micro-joystick; a touchpad, which emulates a rotary encoder; a VersaPad OEM input pad marketed by Interlink Electronics, Inc. of Camarillo, Calif.), which collects user input through direct physical manipulation, with or without employing any moving part(s), and which converts such input, either directly or indirectly through an associated processor and/or converter, into a corresponding digital form.

As employed herein, the term "rotary menu" shall expressly include, but not be limited to, a menu or list of names, icons, graphical identifiers, values and/or other displayed objects, which forms a circular menu having no top and no bottom, a circular list having no top and no bottom, a menu having a top and a bottom in which the top and/or the bottom of the menu need not be displayed at any one time, or a list having a top and a bottom in which the top and/or the bottom of the list need not be displayed at any one time.

As employed herein, the term "network coordinator" (NC) shall expressly include, but not be limited to, any communicating device, which operates as the coordinator for devices wanting to join the network and/or as a central controller in a wireless communication network.

As employed herein, the term "network device" (ND) shall expressly include, but not be limited to, any communicating device (e.g., a portable wireless communicating device; a fob; a fixed wireless communicating device, such as, for example, switch sensors, motion sensors or temperature sensors as employed in a wirelessly enabled sensor network), which participates in a wireless communication network, and which is not a network coordinator.

As employed herein, the term "node" includes NDs and NCs.

As employed herein, the term "headless" means without any user input device and without any display device.

As employed herein, the term "server" shall expressly include, but not be limited to, a "headless" base station; and a network coordinator.

FIG. 1 is a block diagram of a wireless home wellness system 2. The system 2 includes a "headless" RF base station 4, a portable RF fob or "house key" 6, and a plurality of RF sensors, such as 8,10,12. The RF base station 4 may include a suitable link 14 (e.g., telephone; DSL; Ethernet) to the Internet 16 and, thus, to a web server 18. The sensors 8,10,12 may include, for example, the analog sensor 8, the on/off digital detector 10, and the sensor 12. The sensors 8,10,12, base station 4 and fob 6 all employ relatively short distance, relatively very low power, RF communications. These components 4,6,8,10,12 form a wireless network 20 in which the node ID for each of such components is unique and preferably is stored in a suitable non-volatile memory, such as EEPROM, on each such component.

The base station 4 (e.g., a wireless web server; a network coordinator) may collect data from the sensors 8,10,12 and "page," or otherwise send an RF alert message to, the fob 6 in the event that a critical status changes at one or more of such sensors.

The fob 6 may be employed as both a portable in-home monitor for the various sensors 8,10,12 and, also, as a portable configuration tool for the base station 4 and such sensors.

The example base station 4 is headless and includes no user interface. The sensors 8,12 preferably include no user interface, although some sensors may have a status indicator (e.g., LED 116 of FIG. 4A). The user interface functions are provided by the fob 6 as will be discussed in greater detail, below. As shown with the sensor 12, the network 20 preferably employs an adhoc, multihop capability, in which the sensors 8,10,12 and the fob 6 do not have to be within range of the base station 4, in order to communicate.

Figure 2A:
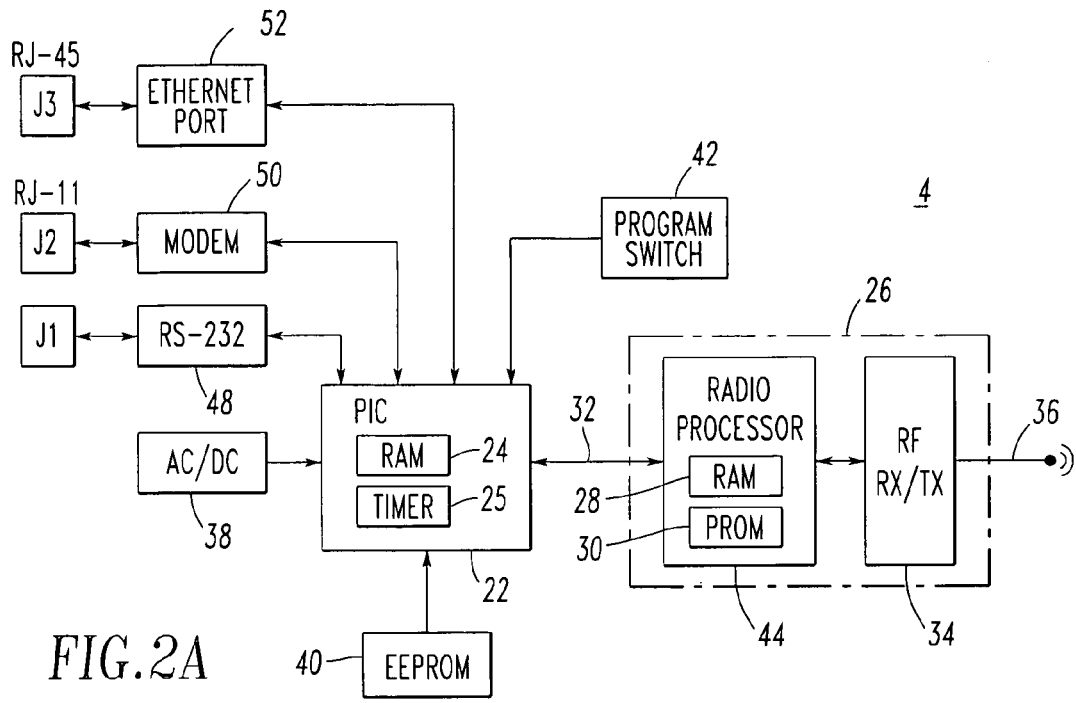
FIG. 2A is a block diagram of the base station of FIG. 1.

FIG. 2A shows the base station 4 of FIG. 1. The base station 4 includes a suitable first processor 22 (e.g., PIC® model 18F2320, marketed by Microchip Technology Inc. of Chandler, Ariz.), having RAM memory 24 and a suitable second radio or RF processor 26 having RAM 28 and PROM 30 memory. The first and second processors 22,26 communicate through a suitable serial interface (e.g., SCI; SPI) 32. The second processor 26, in turn, employs an RF transceiver (RX/TX) 34 having an external antenna 36. As shown with the processor 22, the various base station components receive power from a suitable AC/DC power supply 38. The first processor 22 receives inputs from a timer 25 and a program switch 42 (e.g., which detects mating or engagement with the fob 6 of FIG. 1). The EEPROM memory 40 is employed to store the unique ID of the base station 4 as well as other nonvolatile information such as, for example, the unique IDs of other components, which are part of the wireless network 20, and other configuration related information. The second processor 26 may be, for example, a CC1010 RF Transceiver marketed by Chipcon AS of Oslo, Norway. The processor 26 incorporates a suitable microcontroller core 44, the relatively very low-power RF transceiver 34, and hardware DES encryption/decryption (not shown).

Figure 2B:
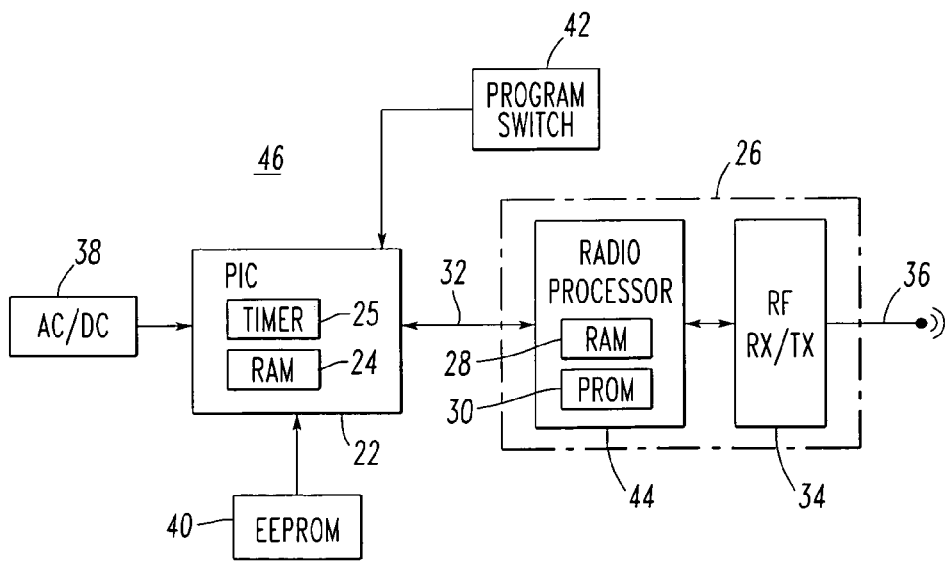
FIG. 2B is a block diagram of a base station in accordance with another embodiment of the invention.

FIG. 2B is a block diagram of another base station 46. The base station 4 of FIG. 2A is similar to the base station 46 of FIG. 2B, except that it also includes one or more interfaces 48,50,52 to a personal computer (PC) (not shown), a telephone line (not shown) and a network, such as an Ethernet local area network (LAN) (not shown). In this example, the PIC processor 22 communicates with a local PC through a suitable RS-232 interface 48 and connector J1, with a telephone line through a suitable modem 50 and connector J2, and with an Ethernet LAN through an Ethernet port 52 and connector J3. Hence, the modem 50 may facilitate communications with a remote cellular telephone, other portable electronic device (e.g., a PDA 450 of FIG. 10) or a remote service provider (not shown), and the Ethernet port 52 may provide communications with the Internet 16 of FIG. 1 and, thus, with a remote PC or other client device (not shown).

Figure 3:
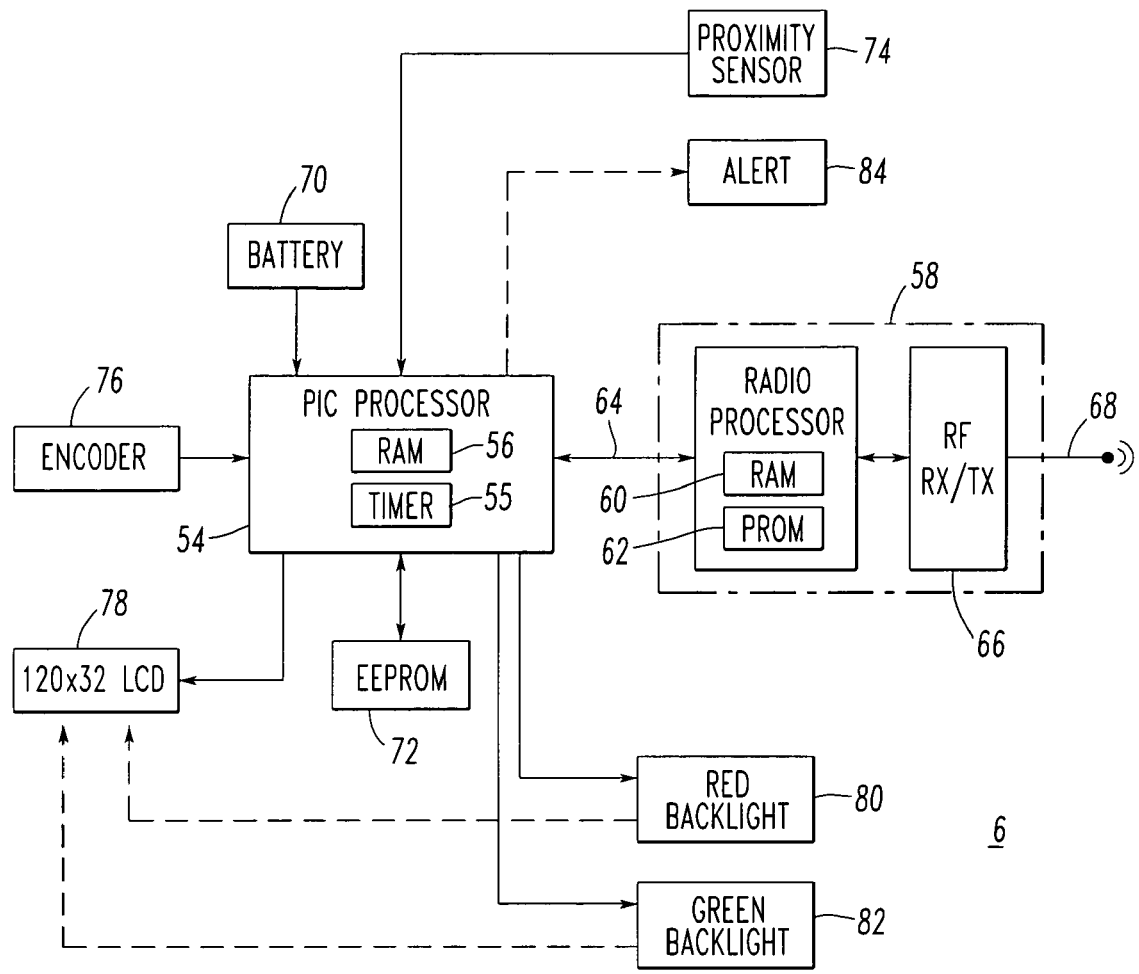
FIG. 3 is a block diagram of the fob of FIG. 1.

FIG. 3 is a block diagram of the fob 6 of FIG. 1. The fob 6 includes a suitable first processor 54 (e.g., PIC) having RAM memory 56 and a suitable second radio or RF processor 58 having RAM 60 and PROM 62 memory. The first and second processors 54,58 communicate through suitable serial interface (e.g., SCI; SPI) 64. The EEPROM memory 72 is employed to store the unique ID of the fob 6 as well as other nonvolatile information. For example, there may be a nonvolatile storage for icons, character/font sets and sensor labels (e.g., the base station 4 sends a message indicating that an on/off sensor is ready to configure, and the fob 6 looks up the on/off sensor and finds a predefined list of names to choose from). This expedites a relatively rapid interaction. The fob 6 may also employ a short term memory cache (not shown) that is used when the fob 6 is out of range of the base station 4. This stores the list of known sensors and their last two states. This permits the user, even if away, to review, for example, what door was open, when the fob 6 was last in range.

The second processor 58, in turn, employs an RF transceiver (RX/TX) 66 having an external antenna 68. As shown with the processor 54, the various components of the fob 6 receive power from a battery 70. The first processor 54 receives inputs from a timer 55, a suitable proximity sensor, such as a sensor/base program switch 74 (e.g., which detects mating or engagement with one of the sensors 8,10,12 or with the base station 4 of FIG. 1), and a user input device, such as, for example, the exemplary encoder 76 or rotary selector/switch, such as a thumbwheel encoder. The first processor 54 also sends outputs to a suitable display 78 (e.g., a 120×32 LCD), one or more visual alerts, such as a red backlight 80 (e.g., an alert is present) and a green backlight 82 (e.g., no alert is present) for the display 78, and an alert device 84 (e.g., a suitable audible, visual or vibrating device providing, for example, a sound, tone, buzzer, vibration or flashing light).

The program switch 74 may be, for example, an ESE-24 MHIT Panasonic® two-pole detector switch or a Panasonic® EVQ-11 U04M one-pole micro-switch. This program switch 74 includes an external pivotable or linear actuator (not shown), which may be toggled in one of two directions (e.g., pivoted clockwise and counter-clockwise; in and out), in order to close one of one or two normally open contacts (not shown). Such a two-pole detector is advantageous in applications in which the fob 6 is swiped to engage the sensor 12 or base station 4, such as is discussed below in connection with FIGS. 11 and 12. Hence, by monitoring one of those contacts, when the fob 6 is swiped in one linear direction (e.g., without limitation, right to left in FIG. 12), the corresponding contact is momentarily closed, without concern for overtravel of the corresponding engagement surface (not shown). Similarly, by monitoring the other of those contacts, when the fob 6 is swiped in the other linear direction (e.g., without limitation, left to right in FIG. 12), the corresponding contact is momentarily closed and another suitable action (e.g., a diagnostic function; a suitable action in response to removal of the fob 6; a removal of a component from the network 20; an indication to enter a different configuration or run mode) may be undertaken.

Although a physical switch 74 is disclosed, an "optical" switch (not shown) may be employed, which is activated when the fob 6, or portion thereof, "breaks" an optical beam when mating with another system component. Alternatively, any suitable device or sensor may be employed to detect that the fob 6 has engaged or is suitably proximate to another system component, such as the base station 4 or sensors 8,10,12 of FIG. 1.

The encoder 76 may be, for example, an AEC 11 BR series encoder marketed by CUI Inc. of Beaverton, Oreg. Although the encoder 76 is shown, any suitable user input device (e.g., a combined rotary switch and pushbutton; touch pad; joystick button) may be employed. Although the alert device 84 is shown, any suitable annunciator (e.g., an audible generator to generate one or more audible tones to alert the user of one or more corresponding status changes; a vibrational generator to alert the user by sense of feel; a visual indicator, such as, for example, an LED indicator to alert the user of a corresponding status change) may be employed. The display 78 preferably provides both streaming alerts to the user as well as optional information messages.

Figure 4A:
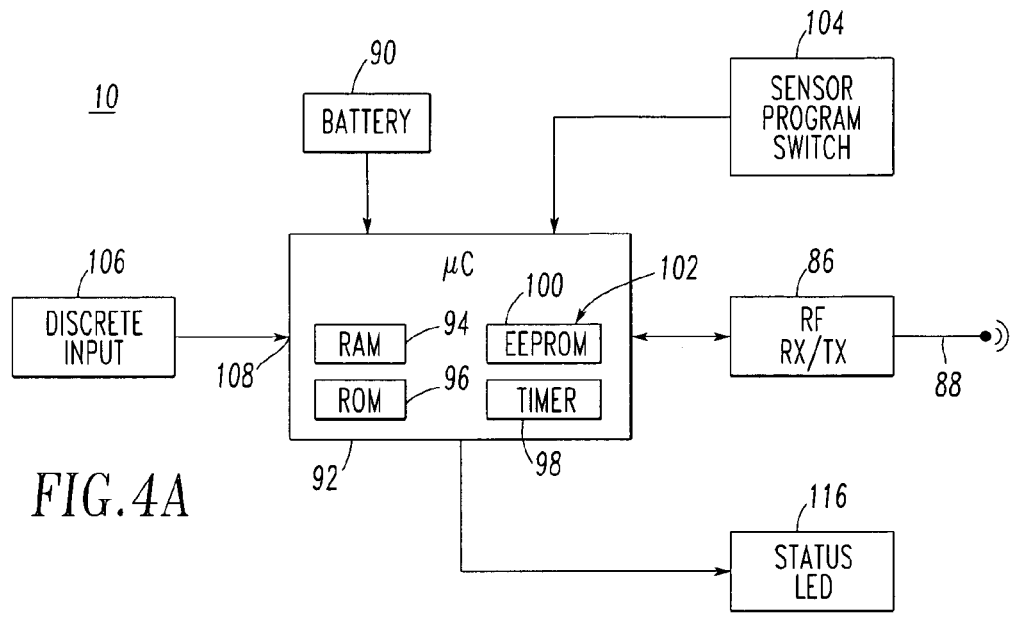
FIGS. 4A and 4B are block diagrams of two of the sensors of FIG. 1.
Figure 4B:
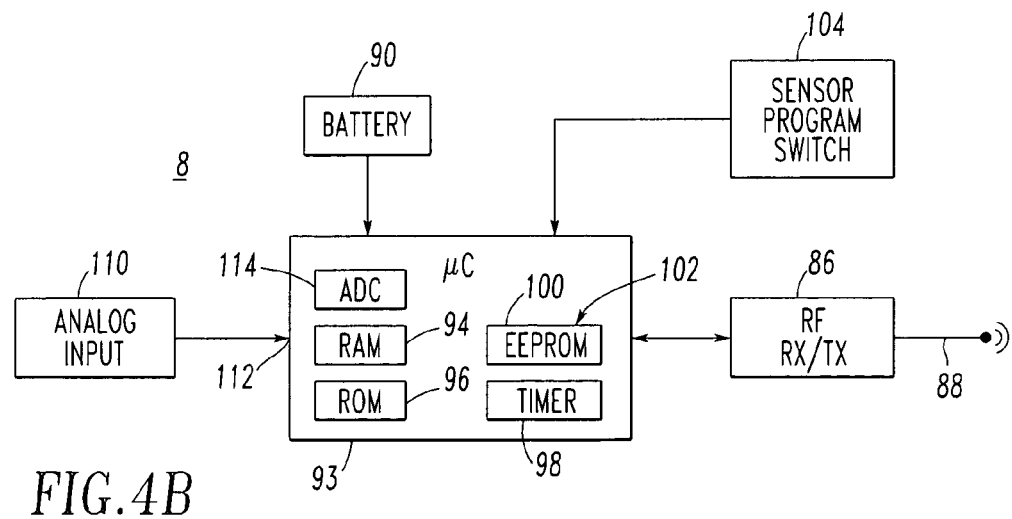

FIGS. 4A and 4B are block diagrams of the on/off digital (discrete) sensor 10 and the analog sensor 8, respectively, of FIG. 1. Each of the sensors 8,10 includes an RF transceiver (RF RX/TX) 86 having an external antenna 88, a battery 90 for powering the various sensor components, a suitable processor, such as a microcontroller (μC) 92 or 93 having RAM 94, ROM 96, a timer 98 (e.g., in order to provide, for example, a periodic wake-up of the corresponding μC 92 or 93, in order to periodically send sensor status information back to the base station 4 of FIG. 1) and other memory (e.g., EEPROM 100 including the unique ID 102 of the component which is stored therein during manufacturing), and a sensor program switch 104 for mating with the fob program switch 74 of FIG. 3. The on/off digital (discrete) sensor 10 includes a physical discrete input interface 106 (e.g., an on/off detector; an open/closed detector; a water detector; a motion detector) with the μC 92 employing a discrete input 108, while the analog sensor 8 includes a physical analog input interface 110 (e.g., temperature sensor having an analog output; a light sensor or photo-sensor having an analog output) with the μC 93 employing an analog input 112 and a corresponding analog-to-digital converter (ADC) 114.

The sensor 10 of FIG. 4A includes a suitable indicator, such as an LED 116, to output the status of the physical discrete input interface 106 (e.g., LED illuminated for on; LED non-illuminated for off). The sensor 8 of FIG. 4B does not include an indicator. It will be appreciated, however, that the sensor 10 need not employ an indicator and that the sensor 8 may employ an indicator (e.g., to show that the battery 90 is OK; to show that the analog value from the ADC 114 is within an acceptable range of values).

Figure 5A:
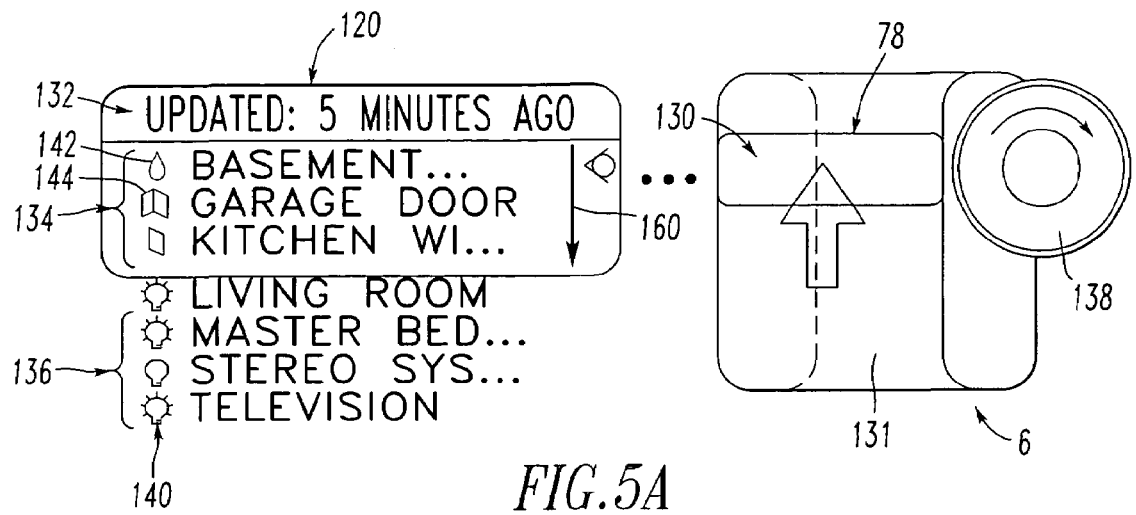
FIGS. 5A-5E are examples of displays used by the fob for monitoring the sensors of FIG. 1.

FIGS. 5A-5E are example displays 120,122,124,126,128 employed by the fob 6 for monitoring various sensors, such as 8,10,12 of FIG. 1. In accordance with an important aspect of this embodiment, the fob display 78 of FIG. 3 provides a rotary menu 130 of information 131, which the base station 4 monitors from the various sensors. As shown in FIG. 5A, such sensors might be associated with various sensor names such as, for example, Basement, Garage Door, Kitchen Wi(ndow), Living Room, Master Bed(room), Stereo Sys (stem) and Television, wherein the parenthetical portion of those names is truncated for display in this example. Also, in this example, the system message region 132 of the fob display 78 shows an overall system/connectivity status of the fob 6 being "Updated: 5 minutes ago" by the base station 4. If, for example, the information is too long to fit in the region 132, then this display region cycles through messages or auto-scrolls from right to left (e.g., in tickertape style). The content region 134 of the fob display 78 shows three of the sensor names (e.g., Basement, Garage Door, Kitchen Wi(ndow)), while the remaining four names 136 (e.g., Living Room, Master Bed(room), Stereo Sys(tem) and Television), in this example, are available for display from the rotary menu 130 in fob PIC processor RAM memory 56 (FIG. 3) by employing the rotary knob 138 as will be described. Thus, the information 131 includes both information for the content region 134 and information for the other names 136.

Figure 5B:
Figure 5C:
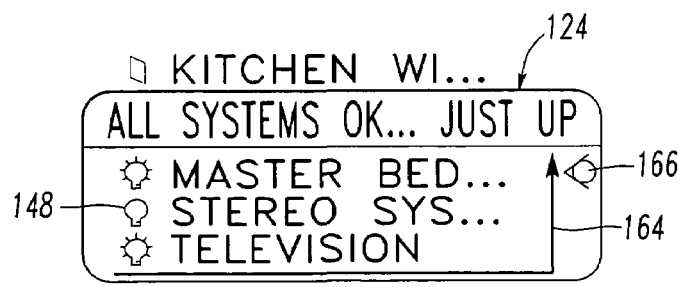
Figure 5D:
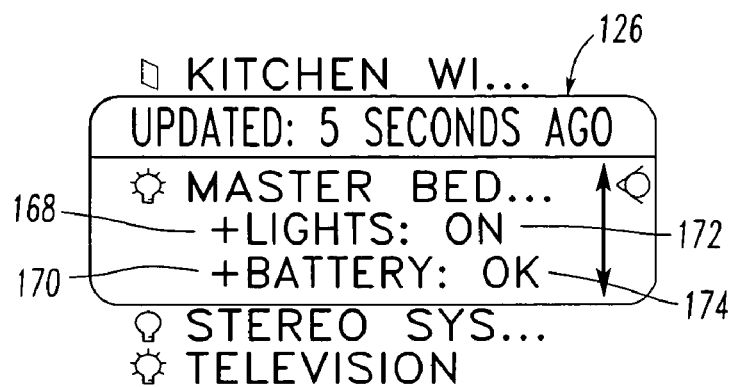

The display content region 134 includes sensor information from the most recent update from the base station 4. For example, the system message region 132 of FIG. 5B shows that the fob 6 is now "Getting Update . . . ," FIG. 5C shows that "All Systems: Ok . . . Just Up(dated)" and FIG. 5D shows that the fob 6 was just "Updated: 5 seconds ago" as measured from the current time.

It will be appreciated that the names in the rotary menu 130 and in the information 131 may be displayed in a wide range of orders. For example, the names may be presented in alphabetical order, in the order that the corresponding sensors 8,10,12 were configured as part of the home system 2 of FIG. 1, in an order reflecting sensor location in such home system, or in an order prioritized by severity. For example, alerts have priority over status information. As a further example, the nature of one sensor (e.g., smoke; fire) and its state (e.g., smoke detected; fire detected) may have a higher severity than that of another sensor (e.g., bedroom lights) and its state (e.g., off).

The various icons 140 of FIG. 5A reflect the actual state of the corresponding sensors. For example, the outline of the water drop icon 142 shows that the corresponding Basement sensor (not shown) has not detected water, the open door icon 144 of the corresponding Garage Door sensor (not shown) shows that the corresponding door (not shown) is open, the lit bulb icon 146 (FIG. 5B) of the Master Bed (room) sensor (not shown) shows that the corresponding light (not shown) is on, and the non-lit bulb icon 148 of the Stereo Sys(tem) sensor (not shown) shows that the corresponding system (not shown) is off.

The sensor names in the rotary menu 130 are scrolled by the rotary knob 138. A sufficient clockwise rotation scrolls the names upward (or the displayed menu 130 downward), for example, two positions, from FIG. 5A to FIG. 5B, such that the names and icons for Kitchen Wi(ndow), Living Room and Master Bed(room) are displayed. Similarly, another sufficient clockwise rotation scrolls the names upward, for example, two positions, from FIG. 5B to FIG. 5C, such that the names and icons for Master Bed(room), Stereo Sys(stem) and Television are displayed. Of course, different amounts of rotation of the rotary knob 138 scroll the names zero, one, two, three or more positions, and a sufficient counter-clockwise rotation (not shown) scrolls the names downward one or more positions.

Figure 5E:
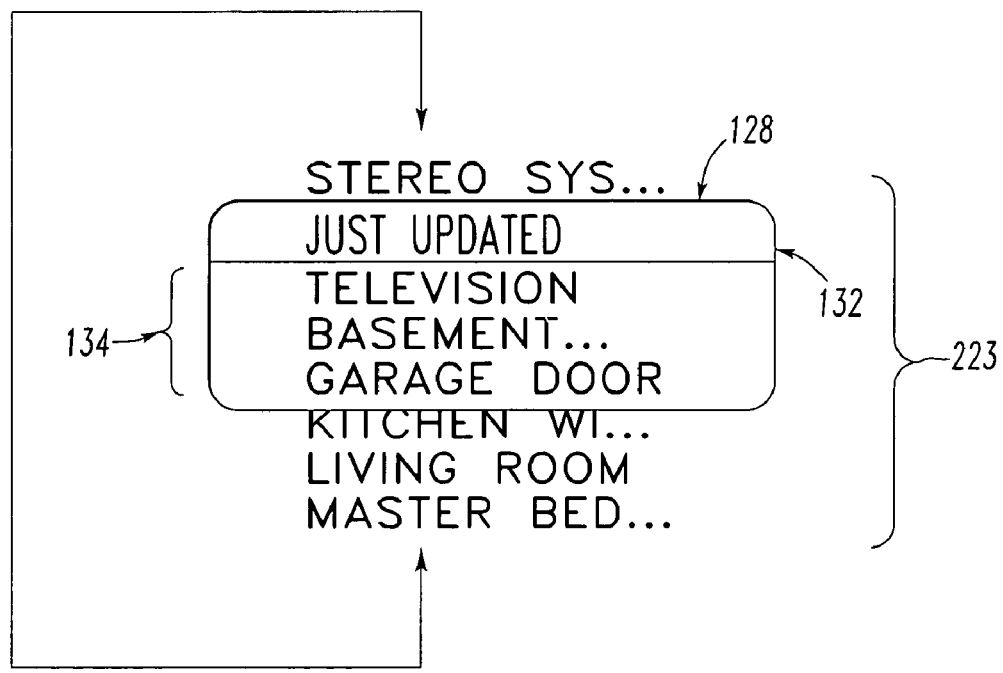
Figure 5F:
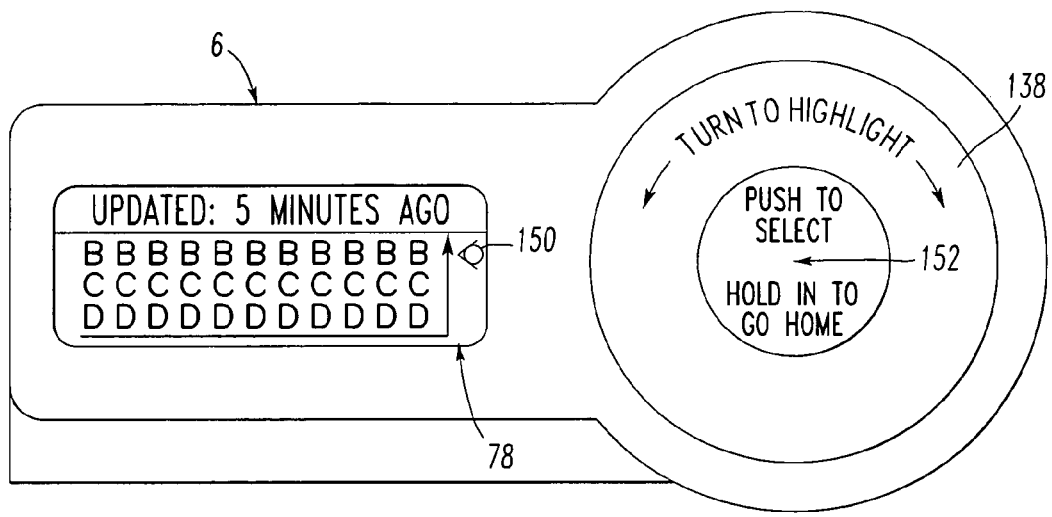
FIG. 5F is a simplified plan view of the fob of FIG. 1.
Figure 5G:
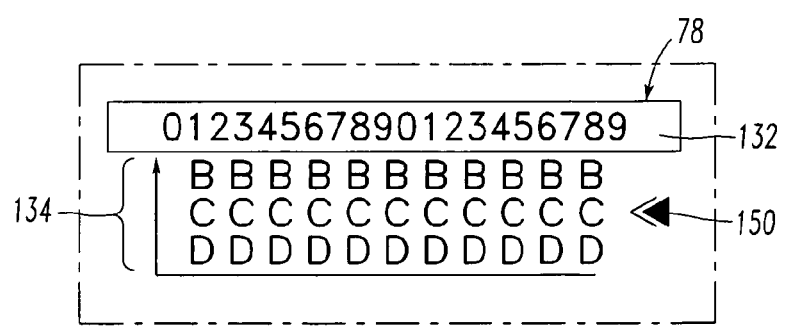
FIG. 5G is a block diagram of the display of the fob of FIG. 5F.

FIGS. 5F and 5G illustrate the user interface of the fob 6 of FIG. 1. This user interface is preferably intuitive, consistent, and predictable, in which the various "screens" (e.g., FIGS. 5A-5E and 6A-6B) in the interface follow a predictable, interaction "physics." The rotating knob 138 on the fob 6 is employed, for example, to select and follow links, which allow the user to navigate from screen to screen. In particular, the rotating knob 138 is used to scroll through information, and highlight and follow links displayed on the display 78.

By rotating the knob 138 clockwise, this scrolls the rotating menu 130 (e.g., as was discussed above in connection with FIGS. 5A-5C). Alternatively, the knob 138 may move the pointer or cursor 150 downward by counter-clockwise rotation under certain user interface conditions as determined by the fob PIC processor 54. Alternatively, the knob 138 may highlight any links displayed on the screen, in sequence. Similarly, by rotating the knob 138 counter-clockwise, this scrolls the rotary menu 130 downward and/or highlights the links in the opposite order.

Pushing the knob 138 at central position 152 functions like pressing the mouse button on a desktop computer. Then, the selected link is typically followed to a new screen. Alternatively, some selected links change just a section of the current screen and/or "unfold" more of the larger virtual scroll. As another alternative, the selected link may perform an operation, such as, for example, resetting a maximum value.

Preferably, navigation is never deeper than one level beyond a home screen (e.g., from FIG. 5C to or from FIG. 5D). When the user takes steps to configure a sensor (e.g., by mating the fob 6 with the sensor 12 of FIG. 1), the fob 6 automatically displays the screen 154 of FIG. 6B. Similarly, when the user completes the sensor configuration (e.g., by selecting "Done/Exit Training?" 156 of screen 158 of FIG. 6B), the screen of FIG. 5A, for example, is automatically re-displayed by the fob 6.

Holding the rotary knob 138 in for a predetermined time (e.g., over about one second) anywhere or anytime during the interaction flow automatically returns the user to the home screen.

FIG. 5G shows that the fob display 78 includes two parts: the system message region 132, and the content region 134. The system message region 132 displays overall system/connectivity status as well as context specific hints. For example, the system message region 132 might display that the fob 6 was "Last Updated: 20 minutes ago" by the base station 4, was "Last Updated: 5 minutes ago" by the base station 4, is currently "Getting Update . . . " from the base station 4, is "Out of Range" of the base station 4, or that the user should "<press button for details>".

As another example, the content region 134 is the largest section of the fob display 78 and is devoted to the display of detailed information (e.g., in the form of relatively large animated icons and text) about the system and elements therein. Often, this screen acts as a "window" into a larger virtual scroll.

The rotary menu 130 of FIG. 5A may be implemented in various manners. Two examples follow.

EXAMPLE 1

In this example, Basement is at the top of the list of information 131 and Television is at the bottom of the list, with no wrapping from Television back to Basement being permitted. Also, in this example, the downward arrow 160 of FIG. 5A indicates that Basement is at the top of the list, the upward and downward arrows 162 of FIG. 5B indicate that the three names are not at the top or the bottom of the list, and the line and upward arrow 164 of FIG. 5C indicates that Television is at the bottom of the list.

EXAMPLE 2

Alternatively, as shown in FIG. 5E, Television is followed by Basement in the content region 134 if there is further clockwise rotation of the rotary knob 138, thereby providing a list or menu that wraps. Similarly, if the rotary knob 138 is then rotated slightly counter-clockwise, the names displayed would include: Stereo Sys(tem), Television and Basement.

As shown in FIG. 5C, the Master Bed(room) name is highlighted by the cursor icon 166 and, when the knob 138 (FIG. 5A) is pushed, the last status information from the corresponding sensor (not shown) is displayed below that name. In this example, the sensor has two attributes, Lights 168 and Battery 170, and the states of those attributes, On 172 and Ok 174, respectively, are also displayed. Generally, sensors include at least the corresponding analog or digital state being monitored, and may also include health information (e.g., battery level; not responding; intermittent).

Figure 6A:
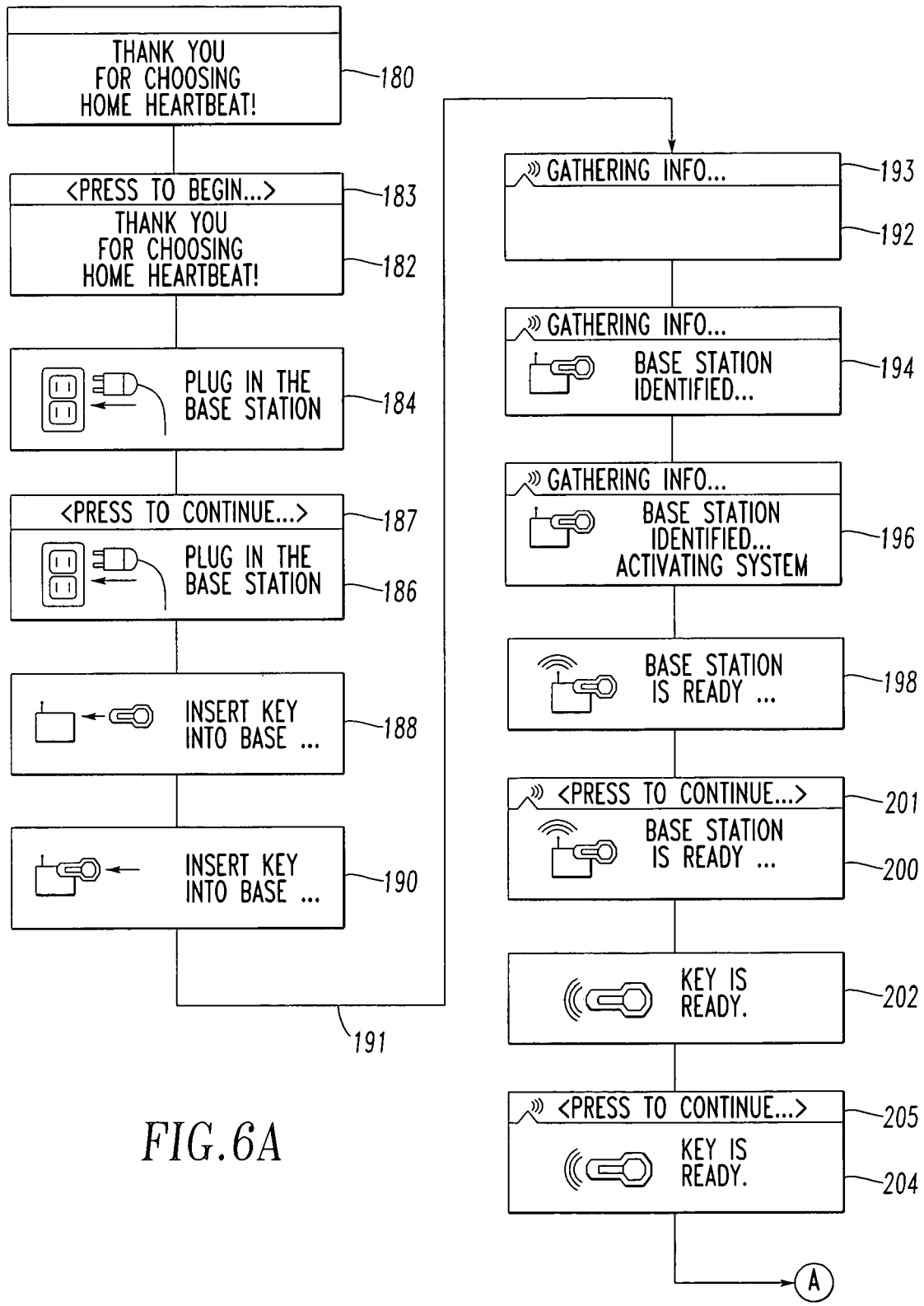
FIGS. 6A and 6B are examples of display sequences used by the fob for configuring the base station and sensors, respectively, of FIG. 1.
Figure 6B:
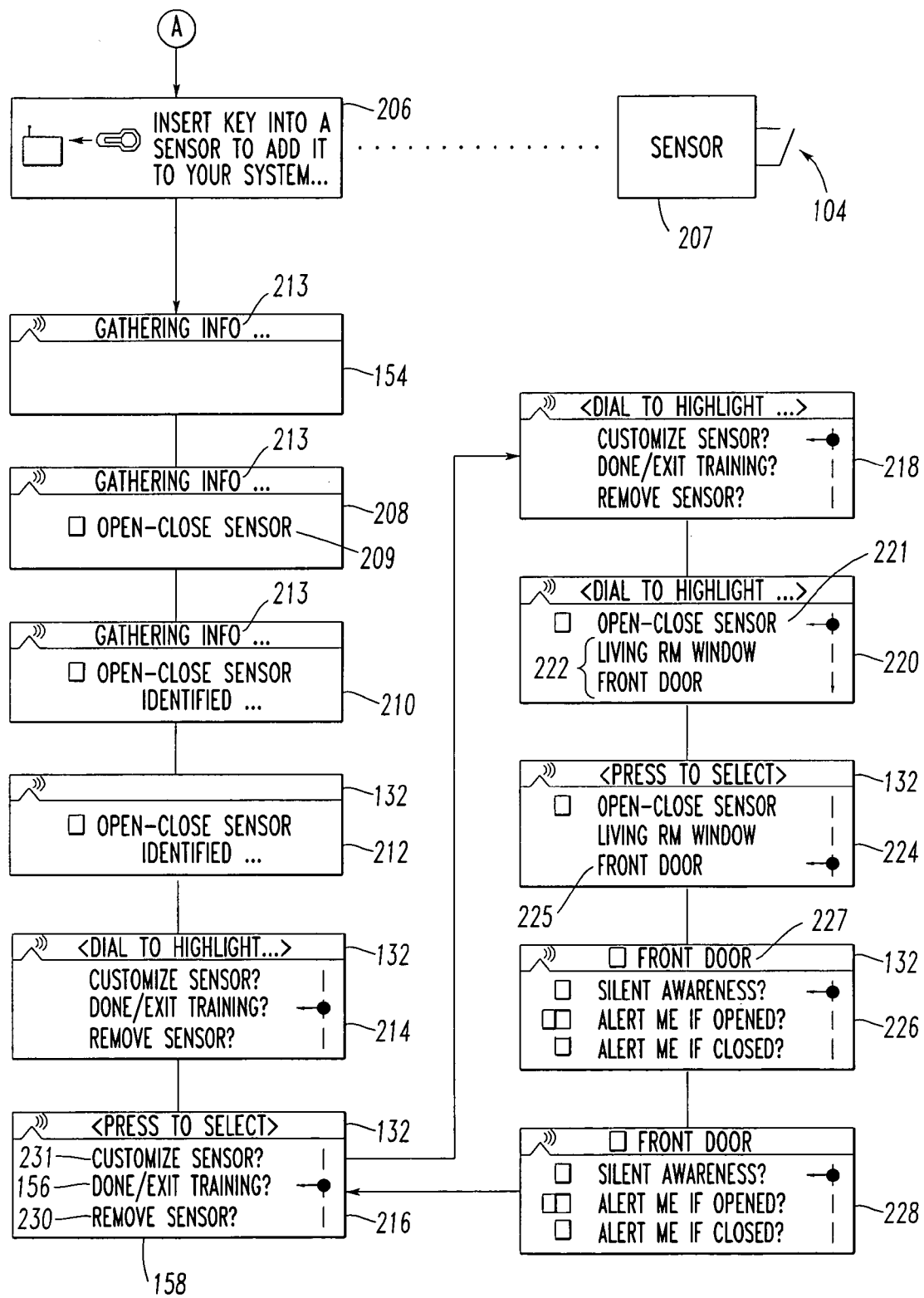

FIGS. 6A and 6B show sequences of displays employed by the fob 6 for configuring the base station 4 and the sensors 8,10,12, respectively, of FIG. 1. FIG. 6A shows a set of fob display screens that the user employs to configure the fob 6 and base station 4. First, screen 180 thanks the user for choosing the system 2. This is followed by screen 182, which prompts the user, at 183, to press the knob 138 of FIG. 5A to begin. The next two screens 184,186 respectively instruct the user to power (e.g., plug in an AC power cord (not shown)) the base station 4 and prompt the user, at 187, to press the knob 138 to continue. The next two screens 188,190 graphically inform the user to insert the fob 6 into the base station 4. Those screens 188,190 are preferably repeated until the fob PIC processor 54 detects that the sensor/base program switch 74 of FIG. 3 is active or closed. When that switch 74 closes in response to the fob 6 being suitably mated with the base station 4, the screen 190 transitions, at 191, to the screen 192, which informs the user, at 193, that the fob 6 is gathering (or exchanging) information with the base station 4 (e.g., the ID of the fob 6 is sent to the base station 4 via the RF transceivers over the wireless network 20, the ID of the base station 4 is sent to the fob 6, and other pertinent data is provided from the base station 4 to the fob 6) by exchanging a series of messages (not shown). Next, the user is informed by screen 194 that the base station 4 has been identified, by screen 196 that the system 2 is being activated, and by screen 198 that the base station 4 is ready. Then, screen 200 prompts the user, at 201, to press the knob 138 to continue. In response to that action, screen 202 informs the user that the fob 6 is ready and, thus, that the fob RAM memory 60 (FIG. 3) includes, for example, the particular node ID of the base station 4 and that both the fob 6 and base station 4 are part of the system 2. Finally, screen 204 prompts the user, at 205, to press the knob 138 to continue. When that action occurs, execution resumes with screen 206 of FIG. 6B.

At screen 206 of FIG. 6B, the user is instructed to insert the fob 6 into a sensor (e.g., a non-configured sensor 207) in order to add it to the system 2 of FIG. 1. In summary, when one of the sensors 8,10,12 is keyed in this manner, the fob 6 begins gathering corresponding information and, then, reports the success to the user. As discussed below, the fob 6 provides the ability to customize the sensor 207, with the status bar 132 cycling through two messages "<dial to highlight . . . >" and "press to select>". Following the screen 206, the screen 154 reports that the fob 6 is gathering information. This is possible, because there are two, and only two, components in the system 2 (e.g., the fob 6 and the particular sensor 207 (or the base station 4), which are mated and which have their corresponding switches 74,104 closed at any one time). As discussed below in connection with FIG. 9B, when the sensor switch 104 is activated by mating with the fob 6, the sensor 207 sends a request to the base station 4 to join the network 20 (attempt_network_discovery). The fob program switch 74 is also activated (e.g., simultaneously) by mating with the sensor 207, and the fob 6 also sends a "program sensor" message to the base station 4. By receiving this "confirmation" message from the fob 6, the base station 4 knows to accept this sensor 207 to the network 20, and sends a nwk_connect_confirm message. Next, screen 208 reports the type of sensor (e.g., an Open-Close Sensor 209 in this example). Then, screen 210 reports that the sensor 207 is identified and screen 212 removes the "<gathering info . . . >" message 213 from the status bar 132.

Next, the screens 214 and 216 prompt the user to "<dial to highlight . . . >" and "<press to select>" one of the three displayed actions: "Customize sensor?", "Done/Exit Training?" And "Remove Sensor?". If the user highlights and presses (e.g., employing the rotary knob 138 of FIG. 5A) "Customize sensor?" at screen 218, then screen 220 is displayed, which confirms that the sensor 207 is an "Open-Close Sensor" 221 and lists in the lower rotary (configuration) menu 222 the possible names of that sensor. In this example, there are two possible names shown, which are based upon the possible locations for such a sensor: Living R(oo)m Window and Front Door, wherein the parenthetical portion of those names is truncated for display in this example. Also, in this example, there may be one, three or more names and the display operation of the rotary (configuration) menu 222 may mimic the display operation of the rotary (monitoring) menu 223 of FIG. 5E. Next, after the user highlights one of the names, such as Front Door 225, the screen 224 prompts the user to press the knob 138 of FIG. 5A to select that name. Next, after the user selects the name, the screen 226 displays the name, Front Door 227, in the system message region 132, and prompts the user to select one of the sensor awareness levels, for example, "Silent awareness?", "Alert me if opened?" and "Alert me if closed?". Although, zero, one, two, three or more awareness levels may be employed for a particular sensor, in this example, "Silent Awareness?" means that the audible buzzer 84 (FIG. 3) of the fob 6 is inactive regardless of the state of that sensor. Otherwise, the user can select that an audible alert as determined by the base station 4 be sounded if that configured sensor is opened or if such senser is closed. Next, at screen 228, the user, in this example, selects "Silent awareness?", which causes the screen 216 to be redisplayed. At that point, if the user highlights and selects the "Done/Exit Training?" option 156, then the newly entered information for the sensor 207 is transferred to the base station 4. Alternatively, if the user highlights and selects the "Remove sensor?" option 230, and regardless whether the sensor 207 was previously added, that information for such sensor is transferred to the base station 4, in order to remove the sensor 207 from the system 2. Finally, if the user highlights and selects the "Customize sensor?" option 231, screen 218 is redisplayed, no information is sent to the base station 4, and the user is prompted to re-enter the information to customize the sensor 207.

Figure 7A:
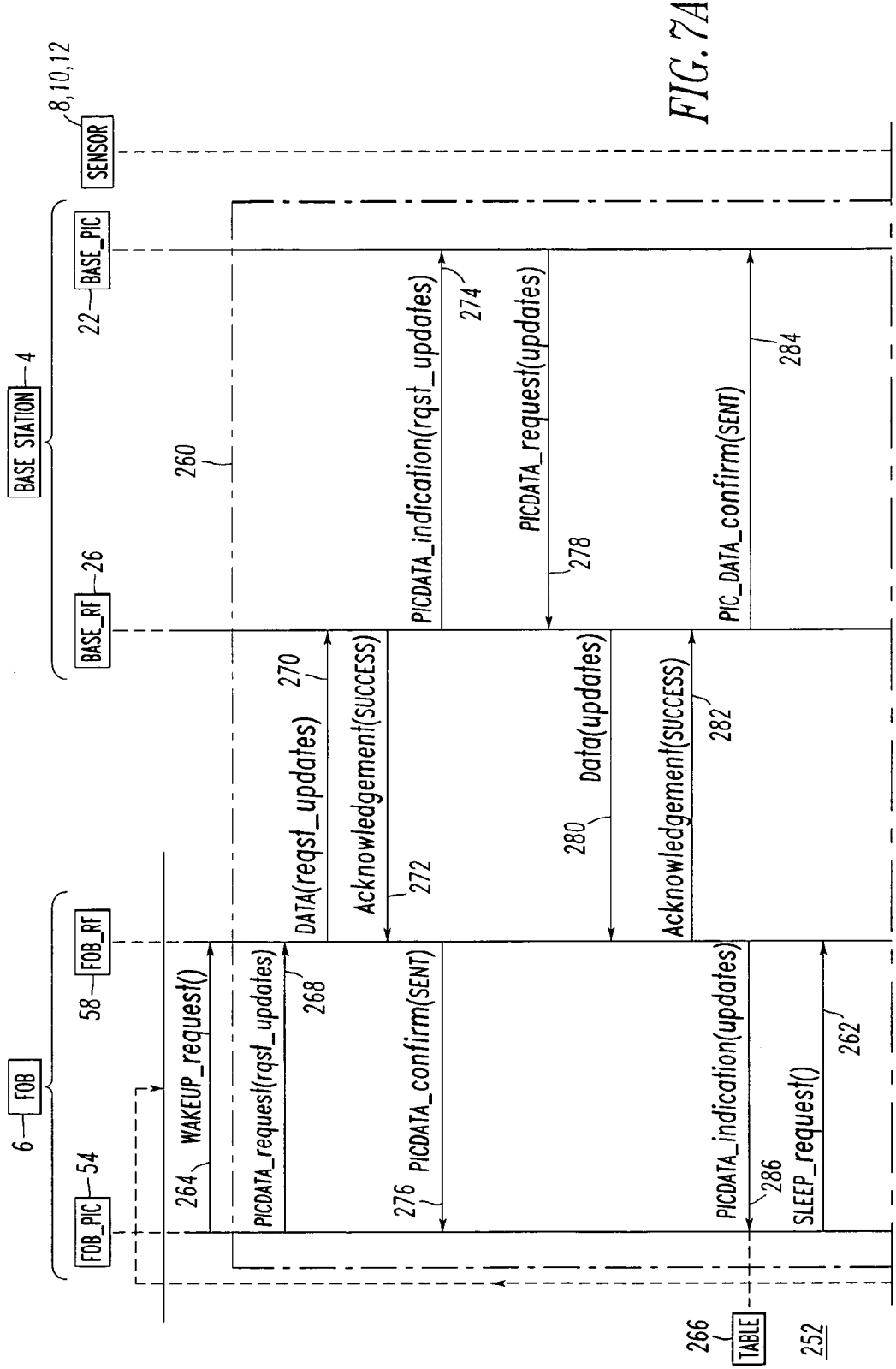
Figure 7C:
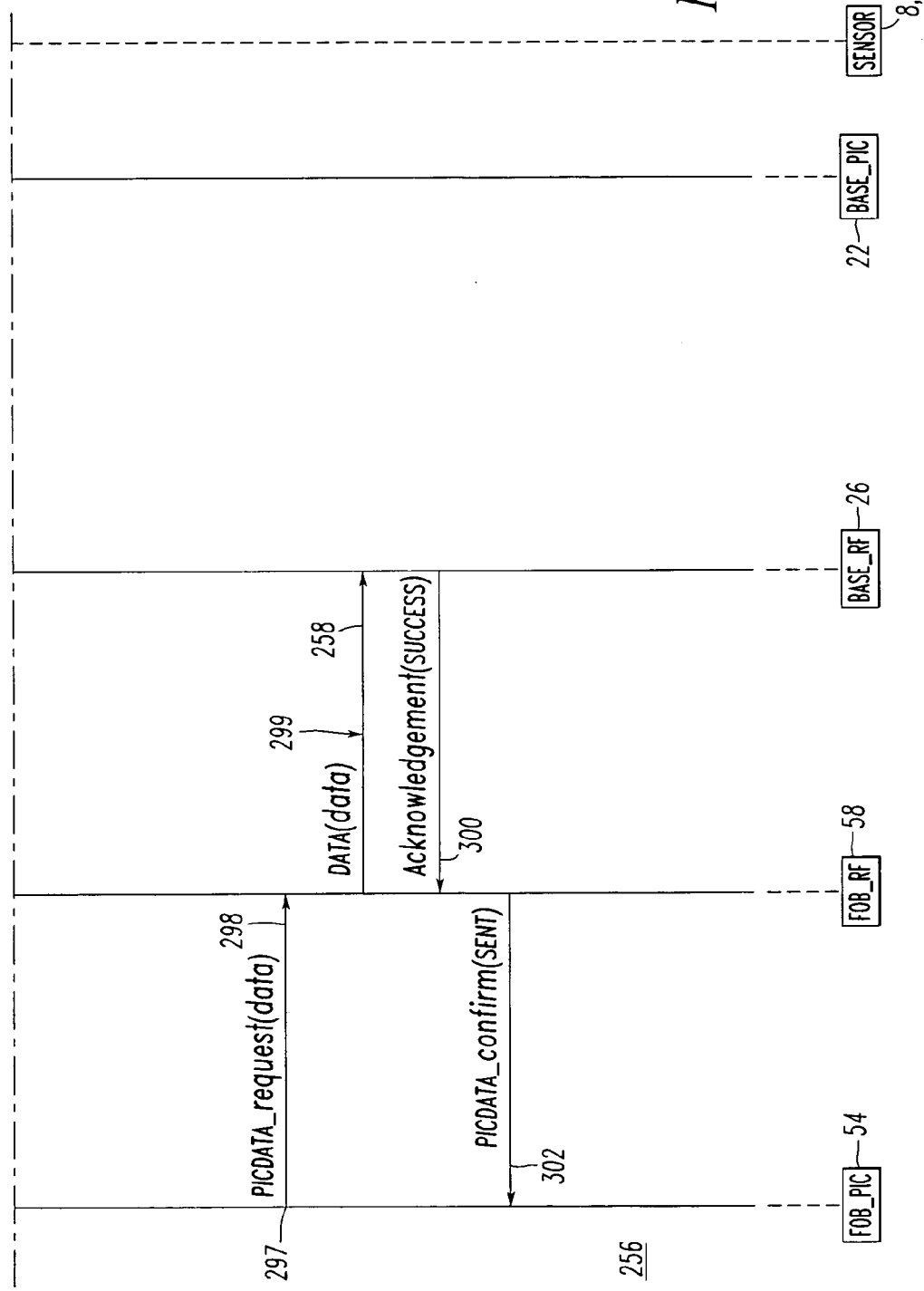

FIGS. 7A, 7B and 7C are message flow diagrams 252, 254 and 256, respectively, showing various messages between the base station 4 and the fob 6 for monitoring the sensors 8,10,12 of FIG. 1 and for sending fob data to such base station. FIG. 7A shows that the fob 6 requests and receives information from the base station 4. Preferably, those requests (only one request is shown) are initiated at regular (e.g., periodic) intervals. FIG. 7B shows that the base station 4 may also send a message to the fob 6 in response to a state change of one of the sensors 8,10,12. In this example, the fob 6 is out of range of the base station 4. FIG. 7C shows that the fob 6 sends fob data 258 to the base station 4. As shown in FIGS. 2A-2B, 3 and 7A-7C, the base station 4 includes both a PIC processor 22 and an RF processor 26, and the fob 6 includes both a PIC processor 54 and an RF processor 58. It will be appreciated, however, that such components may alternatively employ one or more suitable processors.

As shown in FIG. 7A, the fob 6 periodically requests and receives information from the base station 4. The message sequence 260 is also discussed below in connection with FIG. 9B. At the end of that sequence 260, the fob PIC processor 54 sends a SLEEP_request( ) 262 to the fob RF processor 58. Then, after a suitable sleep interval to conserve battery power (e.g., one minute), the fob PIC processor 54 is woken by the fob timer 55 of FIG. 3, and the fob PIC processor 54 sends a WAKEUP_request( ) message 264 to the fob RF processor 58. In turn, the message sequence 260 is executed to refresh the local fob data table 266 with the most recent available information from base station 4 concerning the sensors 8,10,12.

As part of the sequence 260, the fob PIC processor 54 sends a PICDATA_request(rqst_updates) message 268 to the fob RF processor 58, which receives that message 268 and responsively sends a Data(reqst_updates) RF message 270 to the base RF processor 26. Upon receipt of the RF message 270, the base RF processor 26 sends an Acknowledgement (SUCCESS)RF message 272 back to the fob RF processor 58 and sends a PICDATA_indication(rqst_updates) message 274 to the base PIC processor 22. The data requested by this message 274 may include, for example, profile and state information from one or more components, such as the sensors 8,10,12. Here, the fob 6 is requesting an update from the base PIC processor 22 for data from all of the sensors 8,10,12, including any newly added sensor (e.g., sensor 207 of FIG. 6B), in view of that state change (i.e., there is new data from the newly added sensor 207). Responsive to receiving the Acknowledgement(SUCCESS) RF message 272, the fob RF processor 58 sends a PICDATA_confirm (SENT) message 276 to the fob PIC processor 54. Responsive to receiving the PICDATA_indication(rqst_updates) message 274, the base PIC processor 22 sends a PICDATA_request(updates) message 278 to the base RF processor 26, which receives that message 278 and responsively sends a Data(updates) RF message 280 to the fob RF processor 58.

After receiving the Data(updates) RF message 280, the fob RF processor 58 sends an Acknowledgement(SUCCESS)RF message 282 back to the base RF processor 26 and sends a PICDATA_indication(updates) message 286, including the requested sensor update data, to the fob PIC processor 54, which updates its local data table 266. Then, if there is no activity of the fob thumbwheel 138 of FIG. 5F, or if no alert is received from the base station 4, then the fob PIC processor 54 sends a SLEEP_request( ) message 262 to the fob RF processor 58 and both fob processors 54,58 enter a low_power_mode( ) 288,290, respectively.

After receiving the Acknowledgement(SUCCESS)RF message 282, the base RF processor 26 sends a PIC_DATA_confirm(SENT) message 284 back to the base PIC processor 22. Following the message sequence 260, the fob timer 55 awakens the fob PIC processor 54, at 291, which sends the message 264 to the fob RF processor 58, in order to periodically repeat the message sequence 260.

FIG. 7B shows an alert message sequence from the base station 4 to the fob 6, in which the fob 6 is out of range of the base station 4. First, at 293, the base station PIC processor 22 sends a PIC_DATA_request(alert) message 292 to the base station RF processor 26. In response, that processor 26 sends a Data(alert) RF message 294 to the fob RF processor 58. In this example, any RF message sent by the base station 4 while the fob 6 is out of range (or in low power mode) will be lost. After a suitable time out period, the base station RF processor 26 detects the non-response by the fob 6 and responsively sends a PIC_DATA_confirm (OUT_OF_RANGE) message 296 back to the base station PIC processor 22. A successful version of this message sequence 254 is discussed below in connection with FIG. 9B.

In FIG. 7C, at 297, the fob PIC processor 54 sends a PICDATA_request(data) message 298 to the fob RF processor 58. Next, the fob RF processor 58 sends a Data(data) RF message 299 including the fob data 258 to the base station RF processor 26. In response, the base station RF processor 26 sends an Acknowledgement(SUCCESS)RF message 300 to the fob RF processor 58. Finally, the fob RF processor 58 sends a PICDATA_confirm(SENT) message 302 to the fob PIC processor 54.

FIGS. 8A and 8B are message flow diagrams 310,312 showing various messages between one of the sensors 8,10,12 and the base station 4 of FIG. 1 for monitoring that sensor. FIG. 8A shows that the sensor sends state information to the base station 4 at regular (e.g., periodic) intervals. FIG. 8B shows that the sensor also sends state information to the base station 4 in response to sensor state changes. The sensor timer 98 of FIGS. 4A and 4B preferably establishes the regular interval, sensor_heartbeat_interval 314 of FIGS. 8A-8B (e.g., without limitation, once per minute; once per hour; once per day; any suitable time period), for that particular sensor, such as 8,10,12. It will be appreciated that the regular intervals for the various sensors 8,10,12 may be the same or may be different depending upon the desired update interval for each particular sensor.

In FIG. 8A, after the expiration of the sensor_heartbeat_interval 314, the sensor, such as 10, wakes up (wake_up( )) at 316. Next, the sensor 10 sends a Data(state_information) RF message 318 to the base station RF processor 26, and that RF processor 26 responsively sends an Acknowledgement (SUCCESS)RF message 320 back to the sensor 10. Responsive to receiving that message 320, the sensor 10 enters a low_power_mode( ) 324 (e.g., in order to conserve power of the sensor battery 90 of FIG. 4B). Also, responsive to sending that message 320, the base station RF processor 26 sends a PICDATA_indication(state) message 322 to the base station PIC processor 22. Both of the Data(state_information) RF message 318 and the PICDATA_indication(state) message 322 convey the state of the sensor 10 (e.g., sensor on/off; sensor battery OK/low).

The low_power_mode( ) 324 is maintained until one of two events occurs. As was previously discussed, after the expiration of the sensor_heartbeat_interval 314, the sensor 10 wakes up at 316. Alternatively, as shown in FIG. 8B, the sensor 10 wakes up (wake_up( ) 326) in response to a state change (e.g., the sensor 10 detects an on to off transition or an off to on transition of the sensor discrete input 106 of FIG. 4A). Next, the sensor 10 sends a Data(state_information) RF message 328 to the base station RF processor 26, and that RF processor 26 responsively sends an Acknowledgement (SUCCESS)RF message 330 back to the sensor 10. Responsive to receiving that message 330, the sensor 10 enters a low_power_mode( ) 332. After the expiration of the sensor_heartbeat_interval 314, the sensor 10 wakes up at 316 of FIG. 8A. Next, at 333, the base station RF processor 26 responsively sends a PICDATA_indication(state) message 334 to the base station PIC processor 22. Both of the Data(state_information) RF message 328 and the PICDATA_indication(state) message 334 convey the state of the sensor 10. Responsive to receiving that message 334, the base station PIC processor 22 sends a PICDATA_request (alert) message 336 to the base station RF processor 26. Such an alert is sent whenever there is any sensor state change. Finally, the base station RF processor 26 sends a Data(alert) RF message 338 to the fob RF processor 58. The response by that processor 58 and the subsequent activity by the fob 6 are discussed, below, in connection with a sensor joining the network 20 of FIG. 1 and FIG. 9B, which shows the procedure and messages for the state update.

Figure 9B:
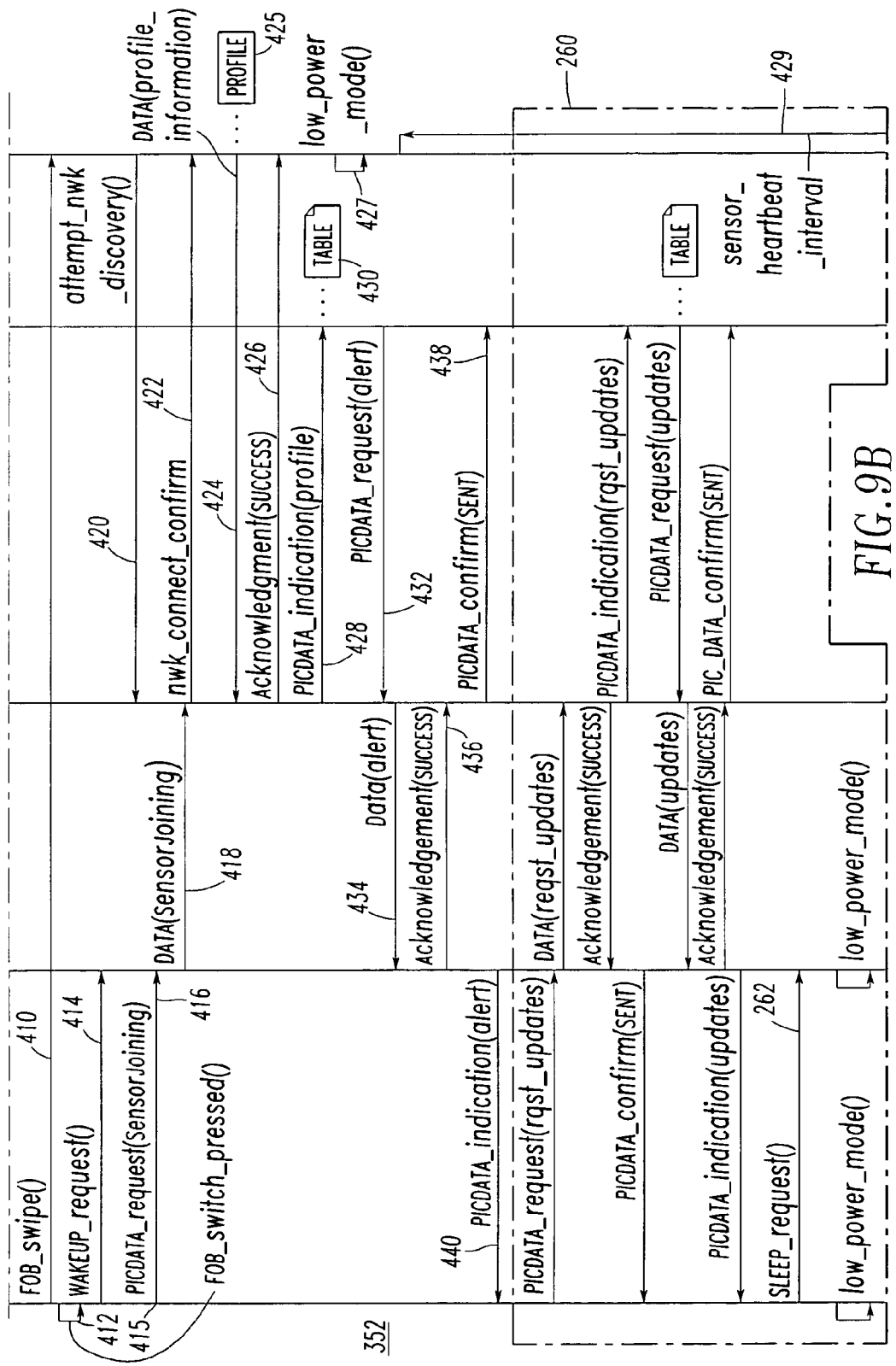

FIGS. 9A and 9B are message flow diagrams 350,352 showing the interaction between the fob 6, one sensor, such as 10, and the base station 4 of FIG. 1 for configuring that fob and sensor. In FIG. 9A, after the four processors 54,58,26,22 complete respective power_on( ) initialization 354,356,358,360, the fob 6 may join the network 20 of the base station 4. The sensor 10 also initiates power_on( ) initialization 362.

Initially, in response to the screens 188,190 of FIG. 6A, the user undertakes a FOB_swipe( ) 364 of the fob 6 with the base station 4. In view of the screens 188,190, the fob PIC processor 54 knows, at this point, that the mated component is the base station 4. The fob PIC processor 54 detects the closure of the sensor/base program switch 74 of FIG. 3 and responsively sends a JOIN_request(NetworkDevice) message 366 to the fob RF processor 58, which responsively executes an initialize_comm_stack( ) routine 368. This routine 368 initializes the communication stack of that processor, which provides suitable software services for communication from one RF component (e.g., the fob 6) to another RF component (e.g., the base station 4). Next, the fob RF processor 58 sends an attempt_nwk_discovery( ) RF message 370 to the base RF processor 26, which may or may not be ready for that message. Only after the base station 4 has successfully initialized, will these discovery attempts of the fob 6 be successful. At that point, the fob 6 can transmit its profile 363 to the base station 4.

When the base PIC processor 22 is notified, as a result of the FOB_swipe( ) 364 of the fob 6 with the base station 4, of the closure of the program switch 42 of FIG. 2A, it responsively sends a JOIN_request(NetworkCoordinator)

371 message to the base RF processor 26, which responsively executes an initialize_comm_stack( ) routine 372. As a result, the base communication stack is initialized and the base RF processor 26 is ready to accept requests from other components to join the network 20 of FIG. 1. When the routine 372 concludes, the base RF processor 26 sends a JOIN_confirm(SUCCESS) message 374 back to the base PIC processor 22. Therefore, the base RF processor 26 is now ready to accept requests from other components (e.g., the sensor 10; the fob 6) to join the network 20.

Although the first attempt_nwk_discovery( ) RF message 370 to the base RF processor 26 was ignored, since the routine 372 had not yet concluded, a second or subsequent attempt_nwk_discovery( ) RF message, such as 376, is sent to and is received by the base RF processor 26. That processor 26 receives the message 376 and responds with a nwk_connect_confirm( ) RF message 378 back to the fob RF processor 58. When the message 378 is received, the fob RF processor 58 sends a JOIN_confirm(SUCCESS) message 380 back to the base PIC processor 54.

The profile 363, for a component such as the fob 6, includes suitable component identification information, which, for example, identifies the component as a fob and provides the node ID and any attributes thereof. The profile 363 is transmitted to the base RF processor 26 after the fob RF processor 58 has joined the network 20 of FIG. 1. In this regard, the fob RF processor 58 may periodically attempt that action as shown by the example sequence of two attempt_nwk_discovery( ) RF messages 370,376 to the base RF processor 26. It will be appreciated that one or more of such attempts are employed. Also, such attempts at discovery may be employed after power is on and independent of the engagement of the fob 6 with the base station 4.

At 381, the fob 6 can transmit its profile 363 to the base station 4. The fob PIC processor 54 sends a PICDATA_request(profile) message 382 to the fob RF processor 58, which responsively sends a DATA(profile_information) RF message 384. That message 384 is received by the base RF processor 26. In response, that processor 26 sends an Acknowledgement(SUCCESS)RF message 386 back to the fob RF processor 58. Upon receipt of that message 386 by the fob RF processor 58, it sends a PICDATA_confirm (SENT) message 388 back to the fob PIC processor 54.

After sending the Acknowledgement(SUCCESS)RF message 386, the base RF processor 26 sends a PICDATA_indication(profile) message 390 to the base PIC processor 22. Upon receipt of the message 390, the base PIC processor 22 sends a PICDATA_request(profile_confirm) message 392 to the base RF processor 26 and, also, stores the profile 363 for the fob 6 in an internal table 393 of components, which have been added to the network 20. Upon receipt of the message 392, the base RF processor 26 sends a DATA(profile_confirm) RF message 394 to the fob RF processor 58. Upon receipt of that message 394 by the fob RF processor 58, it sends an Acknowledgement(SUCCESS)RF message 396 back to the base RF processor 26 and sends a PICDATA_indication(profile_confirm) message 400 back to the fob PIC processor 54. In response to receipt of that message 400, the fob PIC processor 54 displays the fob acceptance screen 202 ("Key is ready.") of FIG. 6A to the user. Upon receipt of the RF message 396, the base RF processor 26 sends a PICDATA_confirm(SENT) message 398 to the base PIC processor 22. Finally, at 401, the fob PIC processor 54 sends a SLEEP_request( ) message 402 to the fob RF processor 58 and both fob processors 54,58 enter a low_power_mode( ) 404,406, respectively.

Referring to FIG. 9B, in order to join one of the sensors, such as 10, to the network 20 of FIG. 1, the user suitably mates the fob 6 with that sensor. In response, the fob PIC processor 54 detects the sensor/base station program switch 74 of FIG. 3 being closed. In view of the screen 206 of FIG. 6B, the fob 6 knows, at this point, that the mated component is a sensor. Following the FOB_switch_pressed( ) routine 412, the fob PIC processor 54 send a WAKEUP_request( ) message 414 to the fob RF processor 58.

Similar to the fob RF processor's RF messages 370,376, the sensor 10 periodically sends RF messages, such as the attempt_nwk_discovery( ) RF message 420, to the base RF processor 26. Otherwise, the sensor 10 goes to a low power mode, such as 427, if the network discovery attempts are unsuccessful. The sensor 10 then retries (not shown) such network discovery attempts after a suitable time in low power mode.

At 415, after sending the wakeup message 414, the fob PIC processor 54 sends a PICDATA_request(SensorJoining) message 416 to the fob RF processor 58, which, in turn, sends a DATA(SensorJoining) RF message 418 to the base RF processor 26. The physical action of the FOB_swipe( ) 410 also causes the sensor 10 to detect the closure of the sensor program switch 104 of FIG. 4A. Preferably, that action triggers the first RF message 420.

In view of the two RF messages 418,420 to the base RF processor 26, it responsively sends a nwk_connect_confirm( ) RF message 422 back to the sensor 10. Upon receipt of that RF message 422, the sensor 10 sends a DATA(profile_information) RF message 424 back to the base RF processor 26. That RF message 424 includes the sensor profile 425, which includes suitable component identification information, such as type of component (e.g., sensor), the type of sensor (e.g., on/off; one input; battery powered), the node ID and any suitable attributes of the sensor 10. Upon receipt of that RF message 424, the base RF processor 26 sends the sensor 10 an Acknowledgment(SUCCESS)RF message 426. Next, the base RF processor 26 sends the base PIC processor 22 a PICDATA_indication(profile) message 428, including the sensor profile 425. The base PIC processor 22 receives that message 428 and stores the profile 425 in the table 430. The base PIC processor 22 also sends the base RF processor 26 a PICDATA_request(alert) message 432, which indicates that a new sensor 10 has been added to network 20. As will be seen, this message 432 is ultimately communicated to the fob 6, which will, then, need to responsively request data associated with the newly added sensor 10.

After receiving the Acknowledgment(SUCCESS)RF message 426, the sensor 10 enters the low_power_mode( ) 427. In turn, after a suitable sensor_heartbeat_interval 429, the sensor 10 wakes up as was discussed above in connection with FIG. 8A.

Upon receipt of the PICDATA_request(alert) message 432, the base RF processor 26 sends a Data(alert) RF message 434 to the fob RF processor 58, which receives that RF message 434 and responsively sends an Acknowledgement(SUCCESS)RF message 436 back to the base RF processor 26. Upon receipt of the RF message 436, the base RF processor 26 sends a PICDATA_confirm(SENT) message 438 to the base PIC processor 22. Then, after the fob RF processor 58 sends the RF message 436, it sends a PICDATA_indication(alert) message 440 to the fob PIC processor 54. Next, the message sequence 260 of FIG. 7A is executed to provide sensor information for the newly added sensor 10 to the fob 6.

As part of the sensor profile 425, the sensor 10 provides, for example, a node ID, a network address and/or a unique sensor serial number. As part of the messages 416,418, the fob 6 provides a graphical identifier (e.g., a label; sensor name; sensor attribute) associated with the configuration of the sensor (e.g., screen 224 of FIG. 6B provides the name "Front Door" 225 for the sensor being configured).

FIG. 10 shows a PDA 450 associated with the base station 4 of FIG. 1 and the corresponding display screen 452 thereof. The base station 4 communicates with the PDA 450 through RF, cellular or other wireless communications 454 from the web server 18 of FIG. 1. Although a PDA 450 is shown, the base station 4 may communicate, for example, with the fob 6, a PC (e.g., palm top; lap top) (not shown), the Internet 16 of FIG. 1, or a web-enabled telephone (not shown).

The display screen 452 preferably provides a suitable menu 456 (e.g., including status, calendar, setup and sensor information). The "at-a-glance" display also communicates critical information about the "wellness" (e.g., "health") of the home. That information may include information obtained from the sensors 8,10,12 (e.g., mail, temperature, alarm, lights, fire, electric, security, heat, air conditioning (AC), water, and home computer system or wireless LAN firewall).

EXAMPLE 3

The base station 4 may provide remote status and alerts directly to the homeowner or user through, for example, telephone, cellular telephone, pager, e-mail or AOL Instant Messenger messages, remote fob, facsimile, any suitable messaging mechanism, or the Internet 16 of FIG. 1 regarding various home conditions, functions and/or utilities.

EXAMPLE 4

Examples of the types of sensors 12 of FIG. 1 include water leaks; power outages; abnormal temperatures (e.g., home; refrigerator; furnace; air conditioner; heat pump); motion (e.g., child; pet; elderly person; wild animal); alarm (e.g., open or ajar; door; window; cabinet); appliance on (e.g., iron; television; coffee pot); sound (e.g., smoke alarm; intruder alert); status of detached garage; tremor (e.g., earthquake); odor (e.g., natural gas); pressure (e.g., package delivered to front door mat); manual request (e.g., a button is pressed on a "nameable" sensor, such as, for example, "bring takeout" or "out of milk"). The sensor 12 may include, for example, conventional security devices (e.g., motion; door status; window status; smoke; fire; heat; gas (e.g., carbon monoxide, natural gas); alarm) and home condition monitors (e.g., moisture; temperature; power; energy (e.g., natural gas; water; electricity; power)).

EXAMPLE 5

Relatively short range wireless communications (e.g., without limitation, RF) may be employed between the sensors 8,10,12 (and the fob 6) and the base station 4.

EXAMPLE 6

The base station 4 may employ relatively long range communications (e.g., a homeowner's existing land telephone line; DSL modem) in order to reach the owner remotely (e.g., cellular telephone; pager; Internet).

EXAMPLE 7

Locations without a land telephone line may employ a suitable cellular control channel (e.g., like an asset management system) in order to convey sensor information remotely.

EXAMPLE 8

The home wireless communications may be self-configuring in order that a typical homeowner can readily install and easily use the system 2 and sensors 8,10,12 of FIG. 1 with relatively minimal setup.

EXAMPLE 9

Bi-directional wireless communications may be employed between the sensors 8,10,12 (and the fob 6) and the base station 4, in order to assure message receipt/acknowledgment.

EXAMPLE 10

The base station 4 may allow remote control by the fob 6 of selected house functions (e.g., changing the temperature at a thermostat (not shown)).

EXAMPLE 11

The fob 6 may provide a personal dashboard (e.g., status indicators) of the home in order to provide at-a-glance status and awareness of various home conditions.

EXAMPLE 12

The system 2 may provide only relatively short range, wireless communications between the sensors 8,10,12 (and the fob 6) and the base station 4.

EXAMPLE 13

The system 2 may provide relatively short range, wireless communications between the sensors 8,10,12 (and the fob 6) and the base station 4, and relatively long range communications to the owner through a remote fob (e.g., the PDA 450 of FIG. 10). For example, the base station 4 may communicate with a cell (data) phone (not shown) or a pager (not shown) as a remote user interface.

EXAMPLE 14

The system of Example 12 may also provide relatively long range communications to the owner through a remote fob (e.g., the PDA 450 of FIG. 10).

EXAMPLE 15

The system 2 may provide a mechanism to allow the owner through a local or remote fob to forward or send an alert to a service contractor (not shown) or another party.

EXAMPLE 16

The system 2 may be associated with a service provider, which takes calls from the owner or from the base station 4 and contacts "certified" (e.g., trustworthy) contractors.

EXAMPLE 17

The system 2 may be associated with a service provider, which takes calls from the owner or from the base station 4 and responds accordingly.

EXAMPLE 18

The system of Examples 12-15 may not require a service contract (e.g., fees) with a security company.

EXAMPLE 19

The system of Examples 12-18 may address the level of programmability and customization available (e.g., in order to create unique sensor names; script simple logic). The communication interfaces 48,50,52 on the base station 4 may be employed to allow the user to create personalized names for sensors by entering them at a PC or through an Internet browser.

EXAMPLE 20

The fob 6 is preferably portable and relative small. The fob 6, which supports wireless communications, enables the base station 4 to be "headless". In this manner, the user may employ the fob 6 as a user interface to the system 2 wherever the user wants to employ it (e.g., carried; worn; attached to a refrigerator; placed on a table; placed on a nightstand) because it is wireless. The fob 6 provides the user or owner with awareness by exception, and provides peace of mind (i.e., everything is ok in the home).

The fob configuration procedure differs from that of known home products and systems in that it provides a single button 152 and a dial or rotary selector 138 (FIG. 5F), in order to select from a predetermined list of sensor names and attributes based on, for example, the location and type of component being configured (e.g., context aware). The fob 6 combines the low cost of memory, short-range wireless communication, and a plurality of configuration definitions or names (see, for example, Examples 21-27, below). This configuration procedure preferably employs a successively layered interaction protocol (e.g., first time users will only see the top "layer" of interaction choices, such as add a sensor or name a sensor, but once the user has experienced and learned the interaction physics, then they will discover deeper avenues of configuration, such as clicking on a sensor name expands the list to show more details) in order to allow for both first time and experienced user access to typical or most likely system tasks.

EXAMPLE 21

Non-limiting examples of types of the sensors 8,10,12 of FIG. 1 include open/close devices, on/off devices, water detecting devices, water absent detecting devices, motion detecting devices, and event detecting devices.

EXAMPLE 22

Non-limiting examples of sensor identity names for open/close devices include: Door, Window, Back Door, Basement Door, Basement Window, Bathroom Window, Bedroom Door, Bedroom Window, Deck Door, Front Door, Kitchen Door, Kitchen Window, Garage Door, Living Rm Window (or Living Room Window), Pantry, Pet Door, Storage Area, Supply Room, Cabinet, Closet, Drawer, Gun Cabinet, Jewelry Box, Mail Box, Refrigerator, Safe, Trunk, and TV/Stereo Cabinet.

EXAMPLE 23

Non-limiting examples of sensor identity names for on/off devices include: Appliance, Clothes Iron, Coffee Maker, Curling Iron, Game System, Light, Refrigerator, Stereo, Stove, Toaster Oven, and TV.

EXAMPLE 24

Non-limiting examples of sensor identity names for water detecting devices (e.g., an alarm is generated if water is detected) include: Basement Floor, Bathroom Floor, Bed Room, Dining Room, Garage, Laundry Room, Living Room, Storage Area, Sump Pump, Under Sink, and Utility Sink.

EXAMPLE 25

Non-limiting examples of sensor identity names for water absent detecting devices (e.g., an alarm is generated if water is not detected) include: Cat Bowl, Dog Bowl, Fish Tank, Garden, Pool, and Water Bowl.

EXAMPLE 26

Non-limiting examples of sensor identity names for motion detecting devices include: Attic, Baby Room, Back Door, Basement, Driveway, Front, Garage, Hallway, Kitchen, and Pantry.

EXAMPLE 27

Non-limiting examples of sensor identity names for event detectors (e.g., which might respond, for example, to a pushbutton or other user input) include: Help!, Get Milk!, Come Down Here, Come Up Here, I'm Home, Doorbell, Keyfinder, and Community Watch.

As was discussed above in connection with FIG. 9B, during the sensor configuration, the fob 6 and the sensor 10 are communicating (e.g., via RF) with the base station 4 for the storage of configuration details. This is initiated, for example, as a result of the physical mating of the fob 6 and the particular sensor, such as 10. Although the configuration appears, from the user's perspective, as if it is taking place locally (directly), it is actually being mediated by the base station 4. This permits the base station 4 to store/log critical information in nonvolatile memory and/or to report it remotely.

The fob user interface (e.g., FIG. 5F) represents a single, personal "tear off" (e.g., the fob 6 is both removable from the base station 4 or from one of the sensors 8,10,12 and, also, is portable) display and setup device for every aspect of the system 2. Preferably, the user learns the procedure once (e.g., for the base station 4 (FIG. 6A) or for an initial sensor, such as sensor 207 of FIG. 6B) and employs that procedure for the other sensors 8,10,12 of the system 2. In this manner, the base station 4 and the sensors, such as 8 of FIG. 4B, are "headless" and simply "dock" with, "mate" with or are proximate the fob 6 when and where needed. This procedure acts as a logical constraint on the proliferation of nonstandard user interface elements within the system environment. Hence, rather than solve a particularly vexing user interface problem on a given component by, for example, adding buttons to the component and adding instructions to a user's guide, the "tear off" fob user interface affords a flexible, potentially deep, consistent graphical interface for both relatively low cost and relatively high cost/complex components.

The mating of the fob 6 to the system component (e.g., base station 4; sensor 10) provides for an associative/semantic "training" of new components to personalize the system 2 and to provide a given unique home/structure and location. This mechanical mating allows for the system 2 to provide context/location specific display and setup interaction using, for example, physical sensor location as a filtering mechanism, which significantly reduces the overall perceived complexity of the interface. This, further, allows for a "one button/dial" interaction physics on the fob 6. Examples 28-37 and 39, below, further describe examples of the fob mating procedure.

EXAMPLE 28

Known current systems require the user to: (1) memorize a sensor number; (2) mount the sensor in place in the home (e.g., possibly out of range of its main control board); (3) set any sensor specific configuration switches; (4) return to the main control board and test the sensor; (5) associate the memorized sensor number with a, typically, written name/number mapping; and (6) repeat steps (1)-(5) for each of the sensors, while setting distinct and different configuration switches on each sensor. Alternatively, each sensor requires a unique (and usually different) display and input mechanism, in order to learn and program (e.g., different switch(es), knob(s), screen(s) and/or button(s)) on a remote control.

In contrast, the present system 2 employs a single interface "physics" in which the fob rotating knob 138 of FIG. 5F is rotated to scroll through (and/or highlight) various links or information, and the fob button 152 is pressed to select the highlighted link or information. As part of the configuration, the personal interface fob 6 is physically paired or otherwise suitably mated with the component (e.g., sensor 10; base station 4) to be configured. Then, the user reads and answers questions that pop-up on this, now active, component's display on the fob 6 using the above-described single interface "physics". Then, the user places the component in the desired location in the home. For example, if the user walks out of range of the base station 4, the mated fob 6 and component, such as the sensor 10, preferably informs the user of the "out of range" condition. Finally, based on the desired location (e.g., door) and type (e.g., open/closed detector) of component, the user may readily customize it accordingly (e.g., a door sensor automatically displays a list of common names, such as, for example, "Front Door" and "Deck Door").

In this example, the physical pairing of the fob 6 and sensor 10 allows for the filtering of the various interface items (e.g., if paired with a door sensor, then don't show a menu of water detector sensors). Also, the physical location at the time of pairing in the desired environment allows for the filtering of the functionality (e.g., if the sensor 10 is "out of range" of the base station 4, then the fob 6 will display "out of range," which signals to the user that they have exceeded the functional range of the sensor 10).

EXAMPLE 29

Figure 13:
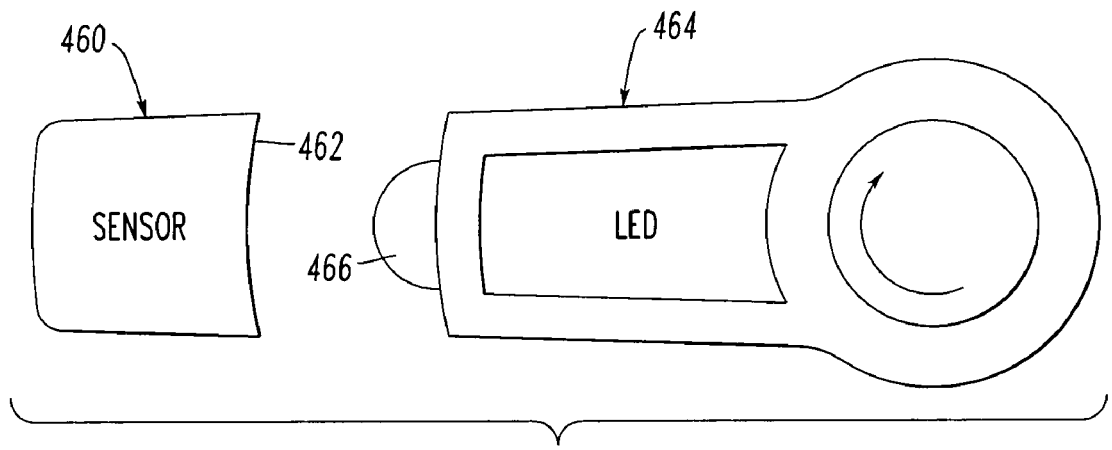
FIGS. 13 and 14 are plan views of a sensor and a portable fob in accordance with another embodiment of the invention.
Figure 14:
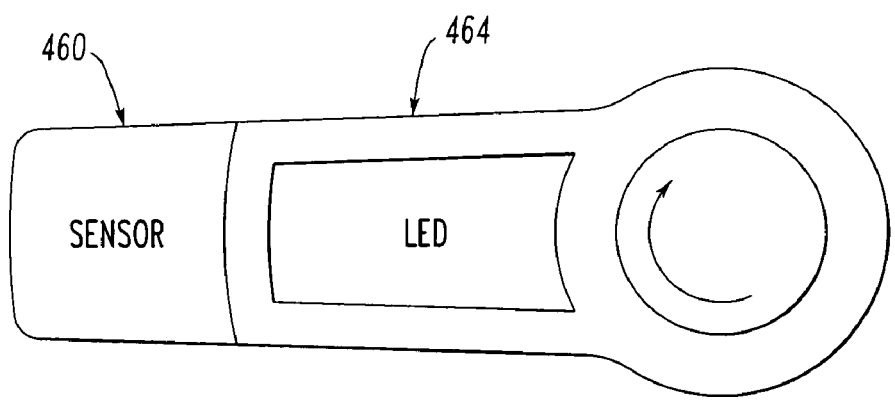

FIG. 13 shows a sensor 460 having a female connector 462 and a proximate fob 464 having a male connector 466 (e.g., a USB style bayonet connector). FIG. 14 shows the mated pair of the sensor 460 and fob 464 in which the male connector 466 is inserted within the female connector 462, in order to provide the signature (e.g., address; serial number) of the sensor 460 directly to the fob 464. This physical "key" fob 464 provides the user with a sense of security in the system 2 of FIG. 1 by "activating" each system component, such as the sensor 460, through the process of "keying" or mating with it. Alternatively, the sensor 460 may wirelessly communicate its signature to the base station 4, rather than to the fob 464.

EXAMPLE 30

Figure 11:
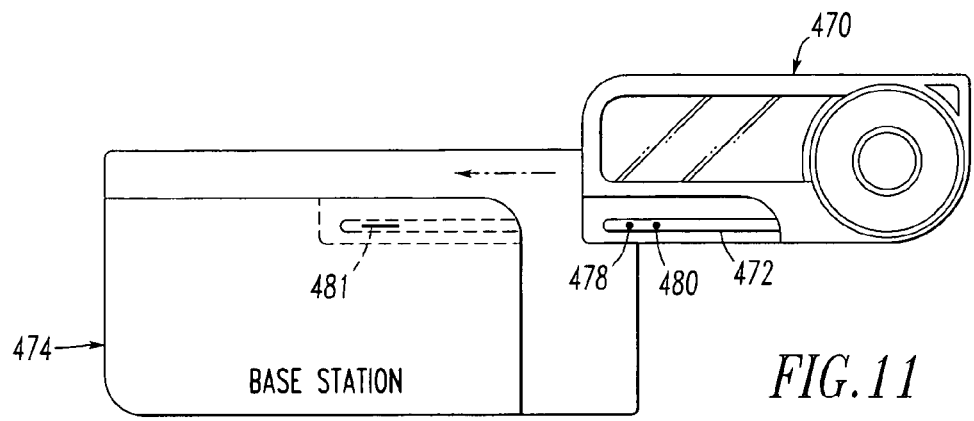
FIGS. 11 and 12 are plan views of a headless base station and a portable fob in accordance with another embodiment of the invention.
Figure 12:
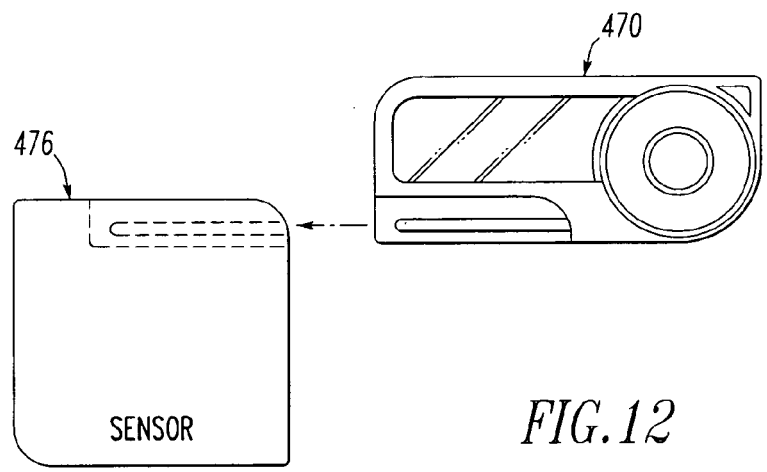

FIGS. 11 and 12 show another fob 470 which employs a recessed "key" notch 472 to engage a base station 474 and sensor 476, respectively. As contrasted with Example 29, this shortens the overall length of the fob 470 by making the electrical connection be part of a slide (e.g., including two longitudinally positioned electrical contacts 478,480) in the recessed "key" notch 472, rather than the USB style bayonet connector 466 of FIG. 13. Those contacts 478,480, in this example, electrically and mechanically engage a conductor 481 in the base station 474.

EXAMPLE 31

Figure 15:
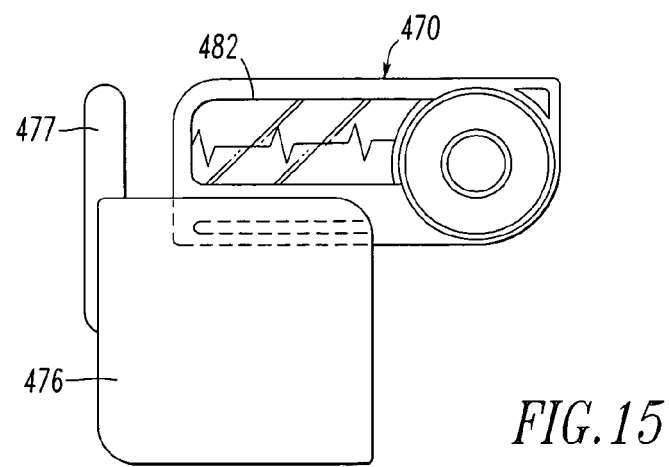
FIG. 15 is an isometric view of the portable fob being mated with the sensor of FIG. 12.

FIG. 15 shows the resulting mating of the fob 470 with the RF sensor 476 having an antenna 477. In this example, the fob 470 may still generally look like a key, although when it is mated, or otherwise "locked up" with the sensor 476, it mimics a "pop-up" display interface 482. This effectively creates an ad-hoc, location-linked "customizable" sensor display for adjustment of a "headless" component, such as the sensor 476.

EXAMPLE 32

Figure 16:
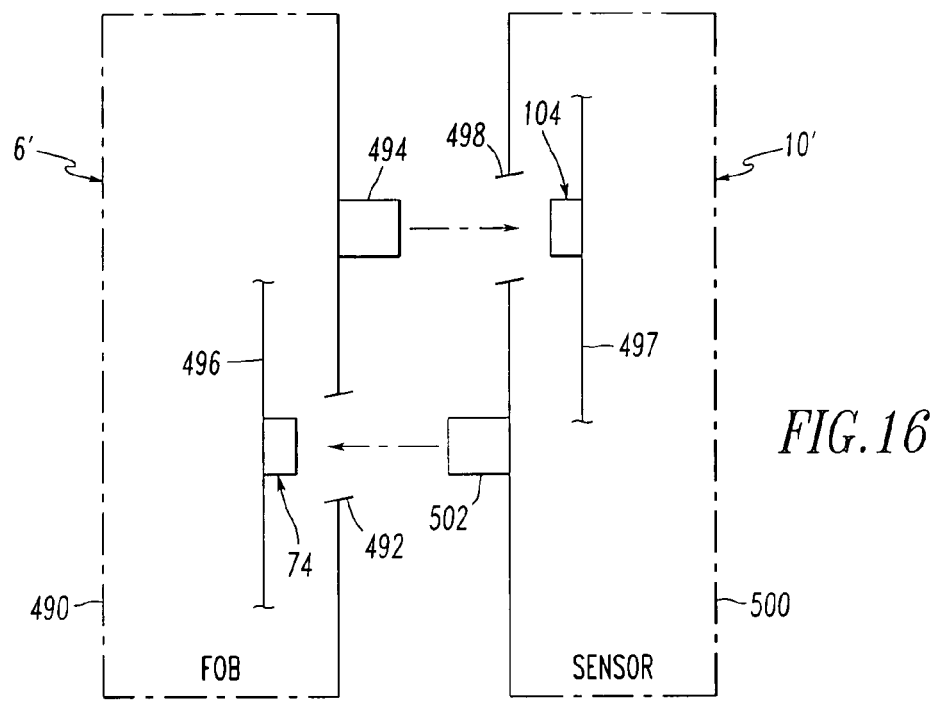
FIG. 16 is a plan view of a sensor and a portable fob in accordance with another embodiment of the invention.

FIG. 16 shows an example of the sensor/base program switch 74 of a fob 6?, and the sensor program switch 104 of a sensor 10?. The fob 6? includes a case or enclosure 490 having an opening 492, a protrusion 494 and a printed circuit board 496 therein. The sensor/base program switch 74 is proximate the opening 492, and the sensor program switch 104 is on a printed circuit board 497 and proximate the opening 498 of the sensor case or enclosure 500. Whenever the fob 6? is suitably mated with the sensor 10?, the fob protrusion 494 passes through the sensor opening 498 and engages the sensor program switch 104. At the same time, whenever the sensor 10? is suitably mated with the fob 6?, the sensor protrusion 502 passes through the fob opening 492 and engages the sensor/base program switch 74.

EXAMPLE 33

The configuration (or binding) mechanism permits the headless base station 4 to associate a particular sensor, such as 10, with a corresponding name (Open-Close) and location (Front Door). First, the portable fob 6 is taken to the particular sensor 10 to be configured as part of the system 2. Next, the fob 6 and the particular sensor 10 are suitable connected, in order that the fob 6 can associate the sensor's identifying signature (e.g., address; serial number) with a corresponding graphical identifier (e.g., label; symbol; icon) on the fob display 78 of FIG. 3. In turn, that information is wirelessly communicated from the fob 6 and/or sensor 10 to the headless base station 4.

EXAMPLE 34

Preferably, the fob 6 employs a relatively simple instruction manual and/or an intuitive sequence of operating steps, in order to provide an out-of-the-box experience for the user. The fob 6 is either temporarily or momentarily mated or otherwise associated with the sensor 10 in order to "learn" the sensor's identifying signature (e.g., address; serial number) and "label" that information with the corresponding graphical identifier (e.g., label; symbol; icon) on the fob display 78. In this manner, the system 2 may "key" the new sensor 10 to the home's system 2, rather than to a neighbor's system (not shown). Also, the system 2 may "key" only the home's sensors 8,10,12 to the home's system 2, rather than any of the neighbor's sensors (not shown). Further, this permits new sensors, such as 207 of FIG. 6B, to be easily added on the system 2 and to train or associate them with unique locations and environments in or about the home.

EXAMPLE 35

The connection mechanism between the fob 464 and the sensor 460 of FIG. 13 may be physical (e.g., employing mechanically and electrically mating connectors 466,462 on both the fob 464 and the sensor 460), in order to communicate the sensor's presence to the fob 464, and in order to communicate the sensor's identifying signature (e.g., address; serial number) to the fob 464 and/or base station 4.

EXAMPLE 36

The connection mechanism between a fob and a sensor may be wireless (e.g., optical; RF on both the fob and the sensor), in order to communicate the sensor's presence to the fob, and in order to communicate the sensor's identifying signature (e.g., address; serial number) to the base station.

EXAMPLE 37

In some instances, the location of the sensor in the system 2, might be such that the sensor is difficult to access. One example is a sensor for a ceiling light fixture, which is difficult to directly access, except by, for example, employing a ladder or similar device. Hence, the sensor and fob may employ a proximity sensor (not shown) and/or an optical port (not shown), which detects when the fob is within a suitable distance of the sensor.

EXAMPLE 38

Although a fob 6, which mimics the shape of a "key," has been disclosed, a wide range of other suitable shapes and sizes of fobs may be employed. For example, other embodiments of such fobs may be in the form of a pendant, a credit card or other object that is directly or indirectly carried and/or worn by a person. Such fobs, for example, may be attached to and/or placed on another household object (e.g., a refrigerator; a table), and/or attached to or carried by a personal object (e.g., a purse; a wallet; a credit card case).

EXAMPLE 39

Figure 17A:
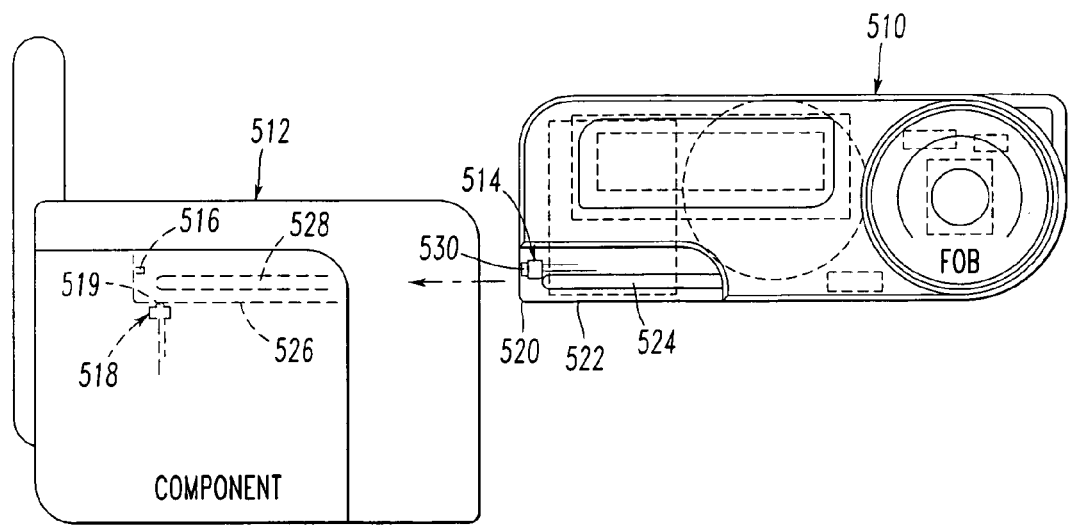
FIGS. 17A-17C are plan views of a system component and a portable fob in accordance with another embodiment of the invention.
Figure 17B:
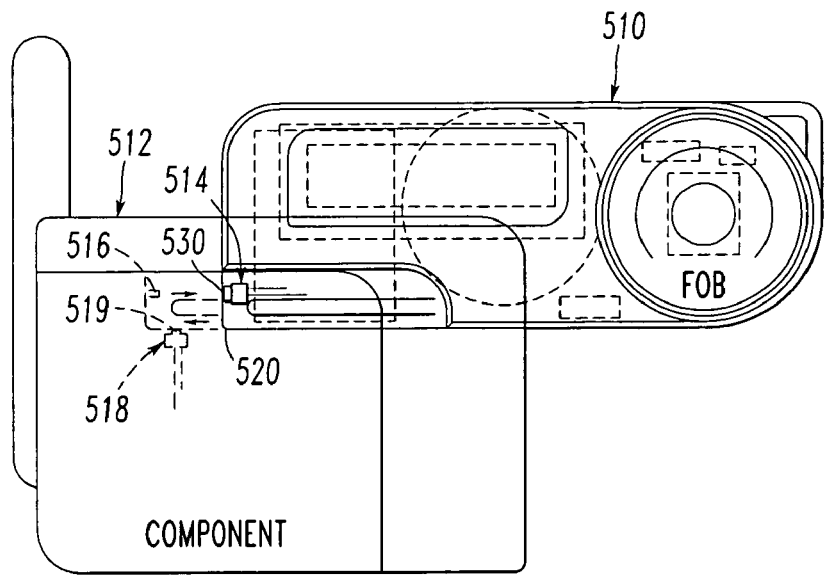
Figure 17C:
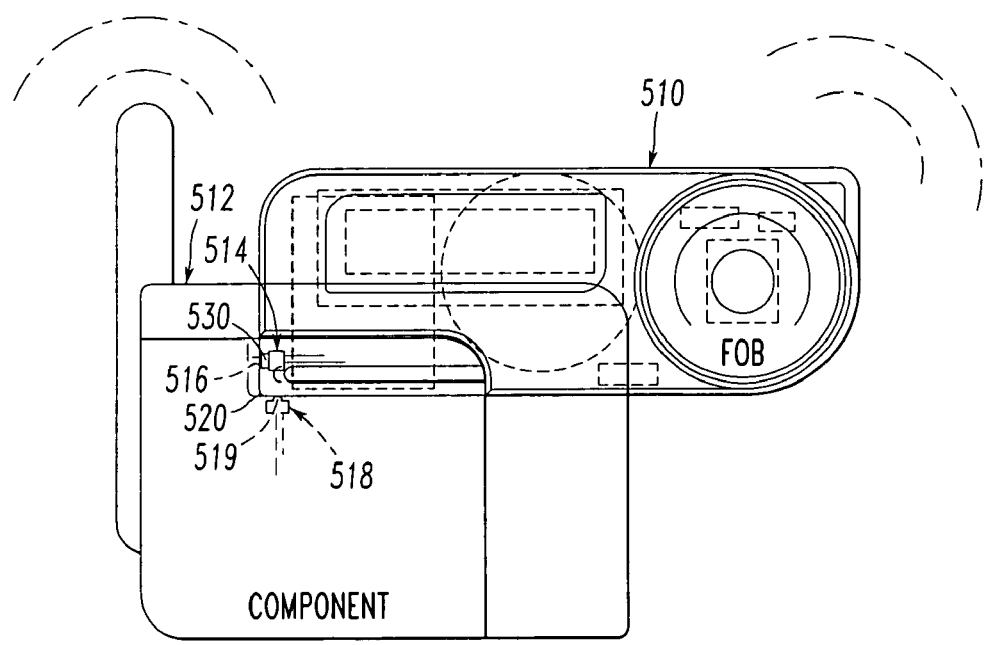

FIGS. 17A-17C show an example of another fob 510 and a wireless system component 512 (e.g., a sensor; a base station), which are suitably mated for configuration of the system component 512 and/or the fob 510. The fob 510 includes a training/mating switch 514, which functions in the manner of the sensor/base program switch 74 of FIG. 3. The component 512 includes a surface or protrusion 516, which is designed to engage the switch 514. The component 512 also includes a training/mating switch 518 having an actuator 519, which functions in the manner of the base program switch 42 of FIG. 2A or the sensor program switch 104 of FIG. 4A. The fob includes a protrusion or surface 520, which is designed to engage the switch actuator 519.

Initially, as shown in FIGS. 17A and 17B, the fob 510 is slid into the component 512. For example, the fob 510 includes an engagement portion 522 having a tongue 524, while the component 512 has a corresponding mating engagement recess 526 (shown in hidden line drawing) with a corresponding groove 528. As the component protrusion 516 approaches the fob switch 514, it engages and activates an actuator 530 thereon, as shown in FIG. 17C. At the same time, as the fob surface 520 approaches the component switch actuator 519, it engages and activates that actuator 519, as shown in FIG. 17C. In turn, when the fob 510 and component 512 are completely seated, with both switches 514,518 being activated, the fob 510 and component 512 may establish RF communications with the base station 4 of FIG. 1 as was discussed above in connection with FIGS. 9A and 9B. In this example, the component switch 518 is activated just before the fob switch 514. Alternatively, the switches 514,518 may be activated at the same or different times. Also, in the example, the component switch 518 may be a two-pole device, which is designed to detect both insertion and removal of the fob 510.

The exemplary home system 2 provides a homeowner with both in-home (referred to as "home alone") and away from home (referred to as "out and about") seven days a week, 24 hours a day awareness of the "wellness" of the home.

While for clarity of disclosure reference has been made herein to the exemplary display 78 for displaying home wellness system information and values, it will be appreciated that such information, such values, other information and/or other values may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for a structure, said system comprising:
  a server including a first wireless communication port;
  a portable fob including a second wireless communication port, a user input device and a display; and
  a plurality of sensors, each of said sensors sensing information and including a third wireless communication port, which sends said sensed information to the first wireless communication port of said server, said server sending said sensed information for at least one of said sensors from the first wireless communication port of said server to the second wireless communication port of said portable fob, said portable fob displaying said sensed information for at least one of said sensors at the display of said portable fob, wherein said server further includes a processor, which detects a state change of the sensed information of one of said sensors, and which sends said state change of the sensed information from the first wireless communication port of said server to the second wireless communication port of said portable fob, wherein said portable fob receives said state change of the sensed information from the second wireless communication port and responsively drives said display, wherein said sensors periodically send said sensed information to the first wireless communication port of said server, and wherein said portable fob periodically requests and receives said sensed information for said sensors between the first and second wireless communication ports.

2. The system of claim 1 wherein the display of said portable fob includes a graphical capability.

3. The system of claim 1 wherein the display of said portable fob includes a plurality of graphical objects; and wherein the user input device of said portable fob is a single rotary switch, which is employed to select one of the graphical objects of said display.

4. The system of claim 3 wherein said rotary switch is adapted to be pushed to select said one of the graphical objects.

5. The system of claim 1 wherein the display of said portable fob includes a plurality of representations of at least some of said sensors; wherein the user input device of said portable fob selects one of said representations; and wherein the display of said portable fob responsively displays said sensed information for a corresponding one of said sensors.

6. The system of claim 1 wherein said sensors and said server employ bi-directional wireless communication links between said third wireless communication ports and said first wireless communication port; and wherein said sensors include a routing function in some of said sensors to communicate with said server through other ones of said sensors.

7. The system of claim 6 wherein said server, said portable fob and said sensors employ bi-directional wireless communication links between said first wireless communication port, said second wireless communication port and said third wireless communication port; and wherein said portable fob and said sensors include a routing function in which said portable fob and some of said sensors communicate with said server through other ones of said sensors.

8. The system of claim 1 wherein said server is adapted to communicate with one of a telephone line, a cellular telephone, a global communication network, a local area network, and a pager as another user interface.

9. The system of claim 1 wherein said portable fob is adapted to be worn by a user.

10. The system of claim 1 wherein said portable fob is adapted to be carried by a user.

11. The system of claim 1 wherein said portable fob is adapted to be placed on a household object.

12. The system of claim 1 wherein said portable fob is adapted to be attached to a household object.

13. The system of claim 1 wherein said portable fob is adapted to configure said at least one of said sensors for at least one of: a sensor name and an alert as function of said sensed information for at least one of said sensors.

14. The system of claim 1 wherein said portable fob is adapted to configure said portable fob for communication with said server responsive to input from said user input device.

15. The system of claim 1 wherein said server is a headless base station.

16. The system of claim 1 wherein said server is a network coordinator for said sensors and said portable fob.

17. The system of claim 1 wherein said server, said portable fob and said sensors form an IEEE 802.11 wireless local area network.

18. The system of claim 1 wherein said server, said portable fob and said sensors form an IEEE 802.15.4 wireless personal area network.

19. The system of claim 1 wherein said portable fob further includes a processor, which receives said state change from the second wireless communication port and which responsively drives said display.

20. The system of claim 19 wherein said portable fob further includes an alert device; and wherein the processor of said portable fob responsively drives said alert device in response to said state change.

21. The system of claim 20 wherein said alert device is one of an audible device, a visual device and a vibratory device.

22. The system of claim 1 wherein the display of said portable fob includes a plurality of graphical objects corresponding to the received sensed information for said sensors.

23. A system for a structure, said system comprising:
a server including a first wireless communication port;
a portable fob including a second wireless communication port, a user input device and a display; and
a plurality of sensors, each of said sensors sensing information and including a third wireless communication port, which sends said sensed information to the first wireless communication port of said server, said server sending said sensed information for at least one of said sensors from the first wireless communication port of said server to the second wireless communication port of said portable fob, said portable fob displaying said sensed information for at least one of said sensors at the display of said portable fob, wherein said server further includes a processor, which detects a state change of one of said sensors, and which sends said state change from the first wireless communication port to the second wireless communication port of said portable fob, wherein said portable fob further includes a processor, which receives said state change from the second wireless communication port and which responsively drives said display, wherein said portable fob further includes an alert device, wherein the processor of said portable fob responsively drives said alert device in response to said state change, wherein said alert device includes a first backlight for said display and a second backlight for said display; and wherein the processor of said portable fob responsively drives one of said first and second backlights in response to said state change.

* * * * *